(12) United States Patent
Pidduck et al.

(10) Patent No.: US 11,556,527 B2
(45) Date of Patent: *Jan. 17, 2023

(54) SYSTEM AND METHOD FOR VALUE BASED REGION SEARCHING AND ASSOCIATED SEARCH OPERATORS

(71) Applicant: OPEN TEXT SA ULC, Halifax (CA)

(72) Inventors: Patrick Thomas Sidney Pidduck, Waterloo (CA); Laura Dianne Ramsahai, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 307 days.

This patent is subject to a terminal disclaimer.

(21) Appl. No.: 16/628,942

(22) PCT Filed: Jul. 5, 2018

(86) PCT No.: PCT/CA2018/050818
§ 371 (c)(1),
(2) Date: Jan. 6, 2020

(87) PCT Pub. No.: WO2019/006550
PCT Pub. Date: Jan. 10, 2019

(65) Prior Publication Data
US 2020/0210419 A1 Jul. 2, 2020

Related U.S. Application Data

(60) Provisional application No. 62/529,345, filed on Jul. 6, 2017.

(51) Int. Cl.
*G06F 16/30* (2019.01)
*G06F 16/242* (2019.01)
(Continued)

(52) U.S. Cl.
CPC ...... *G06F 16/2425* (2019.01); *G06F 16/9027* (2019.01); *G06F 16/90335* (2019.01)

(58) Field of Classification Search
CPC .......... G06F 16/2425; G06F 16/90335; G06F 16/9027; G06F 16/9535; G06F 16/3332; G06F 16/24575
(Continued)

(56) References Cited

U.S. PATENT DOCUMENTS 6,105,023 A  8/2000 Callan
6,807,546 B2 10/2004 Young-Lai
(Continued)

OTHER PUBLICATIONS

Notice of Allowance for U.S. Appl. No. 16/869,148, dated Dec. 15, 2021, 5 pgs.
(Continued)

*Primary Examiner* — Sana A Al-Hashemi
(74) *Attorney, Agent, or Firm* — Sprinkle IP Law Group

(57) ABSTRACT

Embodiments as disclosed herein allow simple specification of searches of values within regions and efficient implementation of such searches. Specifically, embodiments as disclosed may provide a search operator that addresses the problem of complex query construction for finding objects having a particular value, including a minimum or a maximum value, in one of a set of regions, and the efficient implementation of the searches specified by such search operators.

18 Claims, 6 Drawing Sheets

(51) Int. Cl.
  *G06F 16/903* (2019.01)
  *G06F 16/901* (2019.01)

(58) Field of Classification Search
  USPC ........ 707/609, 687, 705, 769, 790, 813, 821
  See application file for complete search history.

(56) References Cited

U.S. PATENT DOCUMENTS

| | | | |
|---|---|---|---|
| 6,988,093 B2 | 1/2006 | Pic et al. | |
| 7,200,271 B2 | 4/2007 | Boose et al. | |
| 7,657,515 B1 * | 2/2010 | Jewell | G06F 16/3332 |
| | | | 707/999.003 |
| 8,219,579 B2 | 7/2012 | Ratiner | |
| 8,326,861 B1 | 12/2012 | Ainslie | |
| 8,572,126 B2 | 10/2013 | Flor | |
| 8,661,023 B1 | 2/2014 | Chun et al. | |
| 8,782,082 B1 | 7/2014 | Xu | |
| 9,165,068 B2 | 10/2015 | Winter et al. | |
| 9,208,254 B2 * | 12/2015 | Zhang | G06F 40/143 |
| 9,348,890 B2 | 5/2016 | Larson | |
| 9,565,209 B1 | 2/2017 | Grzonkowski | |
| 9,824,142 B2 | 11/2017 | Kusumura | |
| 9,836,529 B2 | 12/2017 | Zelevinsky et al. | |
| 10,073,875 B2 * | 9/2018 | Larson | G06F 16/2228 |
| 10,691,709 B2 | 6/2020 | Pidduck et al. | |
| 10,747,815 B2 | 8/2020 | Pidduck | |
| 10,824,686 B2 | 11/2020 | Pidduck | |
| 11,093,518 B1 * | 8/2021 | Lu | G06F 11/3476 |
| 11,106,442 B1 * | 8/2021 | Hsiao | H04L 41/22 |
| 11,327,985 B2 | 5/2022 | Pidduck et al. | |
| 11,449,564 B2 | 9/2022 | Pidduck | |
| 2004/0064447 A1 | 4/2004 | Simske | |
| 2005/0114317 A1 | 5/2005 | Bhide | |
| 2007/0010992 A1 | 1/2007 | Hon | |
| 2007/0011321 A1 | 1/2007 | Huntington | |
| 2007/0106658 A1 | 5/2007 | Ferrari | |
| 2008/0189261 A1 | 8/2008 | Andreev | |
| 2009/0006447 A1 | 1/2009 | Balmin | |
| 2013/0226935 A1 | 8/2013 | Bai et al. | |
| 2013/0262485 A1 | 10/2013 | Li | |
| 2014/0163955 A1 | 6/2014 | Ng Tari | |
| 2015/0178286 A1 | 6/2015 | Dhollander | |
| 2015/0310115 A1 | 10/2015 | Ryger | |
| 2016/0085853 A1 | 3/2016 | Zelevinsky | |
| 2017/0011046 A1 | 1/2017 | Kapoor et al. | |
| 2017/0011114 A1 | 1/2017 | Naressi | |
| 2017/0124162 A1 | 5/2017 | Pidduck et al. | |
| 2017/0371924 A1 | 12/2017 | Ding et al. | |
| 2018/0330009 A1 | 11/2018 | Pidduck et al. | |
| 2019/0272343 A1 | 9/2019 | Pidduck et al. | |
| 2020/0311061 A1 | 10/2020 | Pidduck | |
| 2020/0342030 A1 | 10/2020 | Pidduck | |
| 2021/0011965 A1 | 1/2021 | Pidduck | |
| 2021/0073287 A1 * | 3/2021 | Hunter | H04L 9/3239 |
| 2022/0156255 A1 | 5/2022 | Pidduck | |
| 2022/0342950 A1 | 10/2022 | Pidduck | |

OTHER PUBLICATIONS

Notice of Allowance for U.S. Appl. No. 15/331,327, dated Apr. 3, 2020, 3 pgs.
Notice of Allowance for U.S. Appl. No. 15/976,603, dated May 26, 2020, 6 pgs.
Office Action for U.S. Appl. No. 16/869,148, dated Aug. 19, 2021, 18 pgs.
European Search Report on European Patent Application No. 18829109.0, dated Mar. 15, 2021, 9 pgs.
Office Action for U.S. Appl. No. 15/331,327, dated Apr. 14, 2019, 14 pgs.
International Search Report and Written Opinion issued for International PCT Application No. PCT/IB2019/051253, dated Jun. 11, 2019, 7 pages.
Office Action for U.S. Appl. No. 15/331,327, dated Dec. 31, 2019, 16 pgs.
Office Action for U.S. Appl. No. 15/976,603, dated Jan. 29, 2020, 11 pgs.
Extended European Search Report for Application No. 19765101.1, dated Nov. 22, 2021, 9 pgs.
International Search Report and Written Opinion issued for PCT Application No. PCT/CA2018/050818, dated Oct. 9, 2018, 11 pages.
Office Action for U.S. Appl. No. 15/911,412, dated Mar. 24, 2020, 14 pgs.
Notice of Allowance for U.S. Appl. No. 16/869,148, dated Mar. 30, 2022, 4 pgs.
Office Action for U.S. Appl. No. 17/038,214, dated Mar. 31, 2022, 9 pgs.
Notice of Allowance for U.S. Appl. No. 17/038,214, dated May 27, 2022, 4 pgs.
Office Action for European Patent Application No. 18829109.0, dated Jun. 29, 2022, 10 pgs.

* cited by examiner

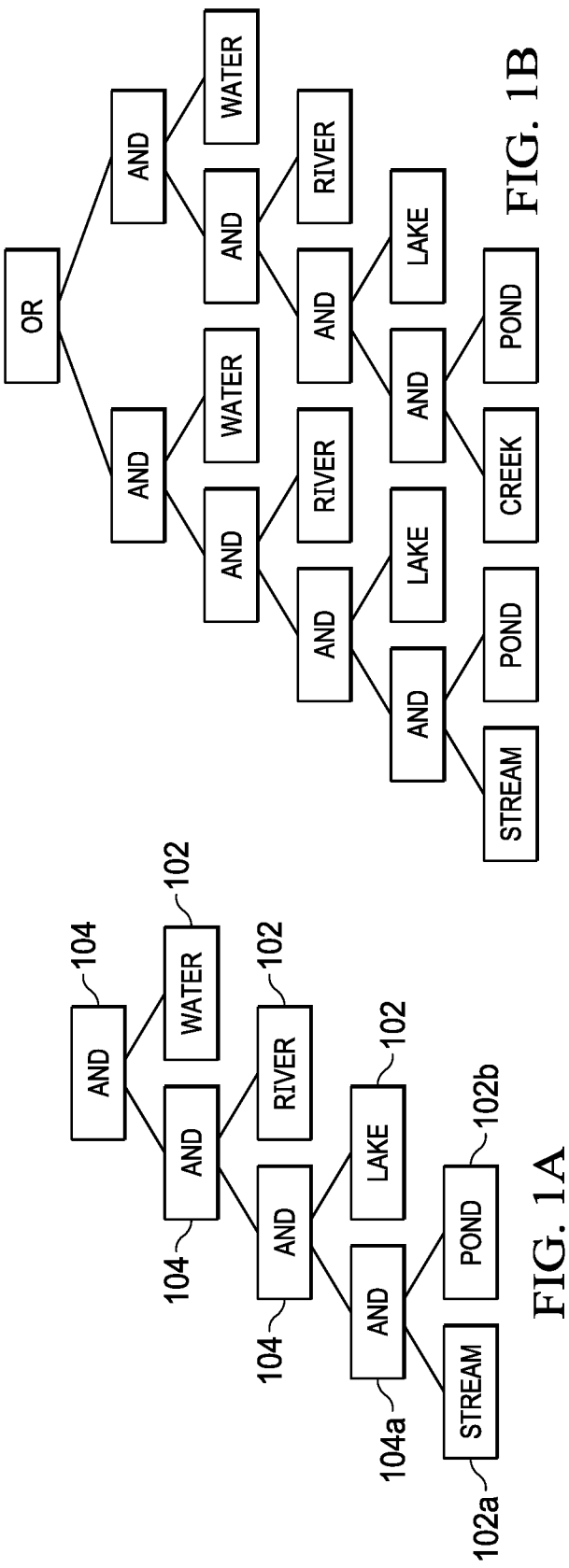
FIG. 1A
FIG. 1B
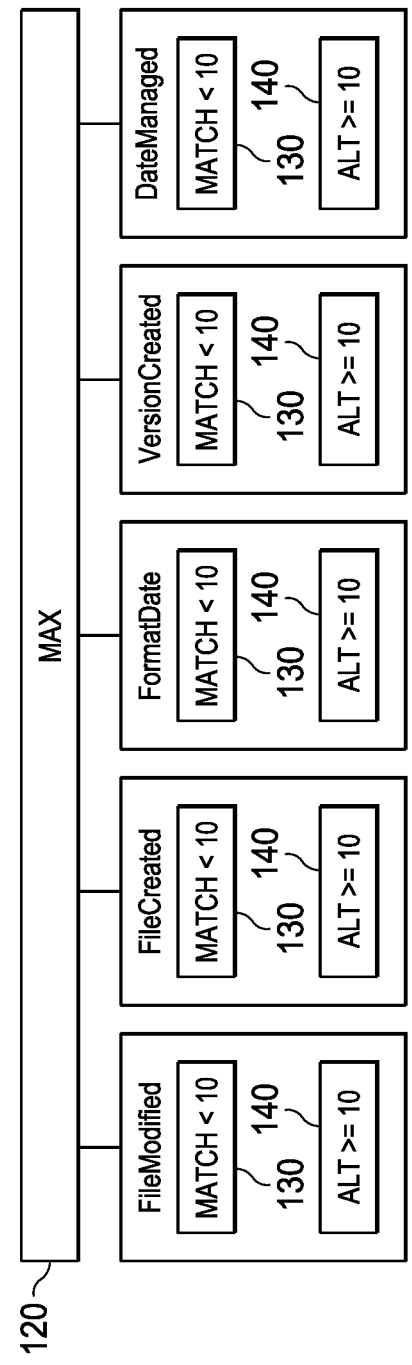
FIG. 1C

| OBJECT ID | AUTHOR ID | OWNER ID | EDITOR ID | AUTHOR NAME | OWNER NAME | CREATOR NAME | EDITOR NAME | TEXT |
|---|---|---|---|---|---|---|---|---|
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |

MATCHES FOR EACH QUERY TYPE

| OBJECT ID | MAXIMUM | | | | MINIMUM | | | |
|---|---|---|---|---|---|---|---|---|
| | >3 | <3 | 3 | !=3 | >3 | <3 | 3 | !=3 |
| 1 |   | X |   | X |   | X |   | X |
| 2 | X |   |   | X |   | X |   | X |
| 3 |   |   | X |   |   | X |   | X |
| 4 | X |   |   | X |   | X |   | X |
| 5 |   | X |   | X |   | X |   | X |
| 6 | X |   |   | X |   | X |   | X |
| 7 |   |   | X |   |   | X |   | X |
| 8 | X |   |   | X |   | X |   | X |
| 9 |   |   | X |   |   | X |   | X |
| 10 | X |   |   | X |   | X |   | X |
| 11 |   |   | X |   |   |   | X |   |
| 12 | X |   |   | X |   |   | X |   |
| 13 | X |   |   | X |   | X |   | X |
| 14 | X |   |   | X |   | X |   | X |
| 15 | X |   |   | X |   |   | X |   |
| 16 | X |   |   | X | X |   |   | X |
| 17 |   | X |   | X |   | X |   | X |
| 18 | X |   |   | X |   | X |   | X |
| 19 |   |   | X |   |   |   | X |   |
| 20 | X |   |   | X | X |   |   | X |

FIG. 8B

DATA:

| OBJECT ID | FIELD1 | FIELD2 | FIELD3 | FIELD4 |
|---|---|---|---|---|
| 1 | 1 | 2 | 1 | 1 |
| 2 | 2 | 4 | 1 | 2 |
| 3 | 3 | 3 | 1 | 3 |
| 4 | 4 |   | 1 | 4 |
| 5 | 1 | 2 | 2 | 1 |
| 6 | 2 | 4 | 2 | 2 |
| 7 | 3 | 3 | 2 | 3 |
| 8 | 4 |   | 2 | 4 |
| 9 | 1 | 2 | 3 | 1 |
| 10 | 2 | 4 | 3 | 2 |
| 11 | 3 | 3 | 3 | 3 |
| 12 | 4 |   | 3 | 4 |
| 13 | 1 | 2 | 4 | 1 |
| 14 | 2 | 4 | 4 | 2 |
| 15 | 3 | 3 | 4 | 3 |
| 16 | 4 |   | 4 | 4 |
| 17 | 1 | 2 |   | 1 |
| 18 | 2 | 4 |   | 2 |
| 19 | 3 | 3 |   | 3 |
| 20 | 4 |   |   | 4 |

FIG. 8A

SYSTEM AND METHOD FOR VALUE BASED REGION SEARCHING AND ASSOCIATED SEARCH OPERATORS

CROSS-REFERENCE TO RELATED APPLICATION(S)

This is a national stage application of and claims the benefit of priority to International Application No. PCT/CA2018/050818, filed Jul. 5, 2018, entitled "SYSTEM AND METHOD FOR VALUE BASED REGION SEARCHING AND ASSOCIATED SEARCH OPERATORS," This application claims a benefit of priority under 35 U.S.C. § 119(e) to U.S. Provisional Application No. 62/529,345, filed Jul. 6, 2017, entitled "SYSTEM AND METHOD FOR VALUE BASED REGION SEARCHING AND ASSOCIATED SEARCH OPERATORS," by inventors Pidduck and Ramsahai, the entire contents of which are hereby expressly incorporated herein by reference for all purposes.

TECHNICAL FIELD

This disclosure relates generally to search engines. More particularly, this disclosure relates to systems and methods for search engines that facilitate specification of complex search queries using simple operators and are capable of efficient implementation of these queries.

BACKGROUND

A search engine is a computer program used to index electronically stored information (referred to as a corpus) and search the indexed electronic information to return electronically stored information responsive to a search. Items of electronic information that form the corpus may be referred to interchangeably as (electronic) documents, files, objects, items, content, etc. and may include objects such as files of almost any type including documents for various editing applications, emails, workflows, etc. In a conventional search engine, a user submits a query and the search engine selects a set of results from the corpus based on the terms of the search query. The terms of search queries usually specify words, terms, phrases, logical relationships, metadata fields to be searched, synonyms, stemming variations, etc.

Generally, there are two basic methods for selecting a set of results from a corpus based on a search query. In the first method, an item that meets the explicit search terms of the search query will be selected. Only items of the corpus that meet the explicit requirements of the search terms are selected and presented. In the second method, for some types of applications, the set of results selected is constrained (or further constrained) by a relevance measure. In particular, results selected by evaluating a search query as an explicit query are further scored and ordered by some criteria, and only the highest results are selected. Relevance scoring may incorporate variables such as the frequency of terms, weights on results with certain values or in specified metadata fields, distance from a value or a date, similarity to other results or objects, etc.

These types of searches may be employed in various different contexts and for various different purposes; however, in certain contexts one or the other type of search may prove more or less useful or apropos for a certain task. Certain areas have, however, proved difficult to the application of searches of either type. Examples of such searches involve searches of certain fields (or regions) where the fields may, or may not, exist for particular documents within the corpus.

When employing search in association with such systems that may maintain regions, determining the meaningful regions to search and which to search may be difficult as these fields may or may not exist or be populated with respect to different documents in the corpus. Accordingly, it may be desired to search objects based on the values within these regions, accounting for the presence (or lack of) a value in these regions, or a priority of these regions.

Traditional search systems do not support the ability to conduct these types of searches. Thus, to implement a search of this type a user must construct a search query that explicitly enumerates each of the possible alternatives. This enumeration process is complex and not easily understood or accomplished by most users. Moreover, these searches (even when optimized) tend to be inefficient. Accordingly, the implementation of a search according to such search queries by typical search engines may consume large quantities of time, memory or other computer resources. In some cases, for certain queries, the resources required for a particular query may exceed the computing resources available or may require that certain computing resources be taken off-line and dedicated to the search in order to complete such a search.

What is needed, therefore, are systems and methods that allow simple specification of searches of multiple of regions based on the values within those regions, and that efficiently implement such searches.

SUMMARY

To those ends, among others, embodiments as disclosed may provide a search operator that addresses the problem of complex query construction for finding objects having a particular value in one of a set of regions (e.g., one or more specified regions), where any values present in the set of regions may be used to determine the responsiveness of the object to the search. Before describing embodiments in more specificity, some additional context may be useful. As discussed, a search engine is a computer program used to index a corpus and search the indexed corpus to return objects responsive to a search. In a conventional search engine, a user submits a query and the search engine selects a set of results from the corpus based on the terms of the search query. The terms of search queries usually specify words, terms, phrases, logical relationships, metadata fields to be searched, synonyms, stemming variations, etc.

Certain areas have, however, proved difficult to the application of search. Examples of such searches involve searches of certain regions where the regions may, or may not, exist for particular documents within the corpus. For instance, in many content management systems, the objects may have many different fields (e.g. metadata fields) associated with each object. Oftentimes these regions are sparsely populated and may have similar or related meanings. Consider the following metadata regions that may be maintained by a content management system such as OpenText's Content Server:

| | |
|---|---|
| FileCreated | Date the document was created, as recorded by the file system on a user's computer. |
| FileModified | Date the document was last modified, as recorded by the file system on a user's computer. |

| | |
|---|---|
| DateManaged | Date the first version of a document was added to the Content Server. |
| VersionCreated | Date the most recent version of the document was added to the Content Server. |
| PaperDate | Date a document was created, perhaps typed. May be much earlier than a FileCreated date if the original typewritten document was later scanned. |
| FormatDate | A date field stored in a document as part of the file format. For example, a Microsoft Word document might keep its own internal value for creation date or modified date. |

For each document in a content management system, these regions may be optional and may be sparsely populated.

Generally, then, when employing search in association with systems such as these that maintain regions, determining the meaningful regions to search and which regions to search, may be difficult as these fields may or may not exist or be populated with respect to different documents in the corpus. Examples of these areas include searches of a corpus of documents in conjunction with litigation discovery or compliance. In particular, continuing with the above example with respect to the metadata fields of a content management system, there may be situations where it is desired to search based on meaningful dates (e.g., documents older or younger than 10 years, documents created over three years ago, etc.).

As the different regions pertaining to dates of a document may or may not be present, it may be desired to search a set of regions pertaining to the date of a document. Again continuing with the above example, if it is desired to find documents younger than 10 years in a content management system having the metadata fields listed above it may be desired to search these regions such that any documents having a value for any date in any of these regions that is younger than 10 years will be deemed responsive to these search.

Now suppose it is desired to search for documents older than ten years in a content management system having the regions defined above using the priority of regions PaperDate, FileModified, FileCreated, FormatDate and DateManaged. This search may be outlined as follows:

```
For each object in the index
    The OldestDate is the minimum of the values in the PaperDate,
FileModified, FileCreated, FormatDate, and DateManaged fields
        If the OldestDate is more recent than 10 years
            Add the object the set of matching results
```

Traditional search systems do not support the ability to conduct these types of searches. Thus, to implement a search of this type, a user must manually construct a search query that explicitly enumerates each of the possible alternatives. This enumeration process is complex and not easily understood or accomplished by most users. Moreover, these searches (even when optimized) tend to be inefficient from a computational and computer resource standpoint. Accordingly, the implementation of a search according to such search queries by typical search engines may consume large quantities of time, memory or other computer resources. In some cases, for certain queries of this type, the resources required for a particular query may exceed the computing resources available, or may require that certain computing resources be taken off-line and dedicated to the search in order to complete such a search.

Continuing with the above example, an enumerated search to find documents that are 10 years old when considering all the relevant date fields in a content management system having the metadata fields listed above may be:
((PaperDate=10 years or PaperDate=null) and (FileModified=10 years or
FileModified=null) and (FileCreated=10 years or FileCreated=null) and
(FormatDate=10 years or FormatDate=null) and (DateManaged=10 years or
DateManaged=null)) and ((PaperDate=10 years) or ((FileModified=10 years) or
(FileCreated=10 years) or (FormatDate=10 years) or (DateManaged=10 years))).

As another example, suppose a content management system maintains an associated region for a creation date, a modified date, an embedded properties date, a record date (when it was declared a formal record), and a system date it was added to the document management system. Furthermore, these dates may be independently optional or sparse. Further suppose that in such a system a user needs to find documents that are more recent than 5 years old. To accomplish this, they want to identify documents where the oldest (or minimum) value of any of these dates is more recent than 5 years in age. A query to accomplish this is very complex, and prone to user error. The query would be of the form:
((FileCreated>−5y or FileCreated is undefined) and (FileModified>−5y or modified is undefined) and (embedded>−5y or embedded is undefined) and (record>−5y or record is undefined) and (system>−5y or system is undefined) and ((created>−5y) or (modified >−5y) or (embedded>−5y) or (record>−5y) or (system>−5y)).

Moreover, the basic form of the necessary query varies depending on whether minimum or maximum values need to be tested, and whether the comparison operation is for equality, inequality, greater than or less than—or for search text matches such as "contains". In general, users are unable to construct a query reliably. This may lead to errors, but more often to lost opportunity as users will not even attempt to work with sets of regions due to the complexity.

Although such a search may be constructed explicitly by an extremely knowledgeable user, these types of search are inefficient, sometimes needing 5n−1 terms to evaluate when there are n regions being assessed. Even in cases where such a query may be refactored or optimized or is a best case scenario, such an optimized search query may be on the order of a high coefficient linear search (e.g., around or greater than 2n−1). Thus, not only are such searches extremely difficult for a user to construct, but even if they can be constructed, they result in a large consumption of computing resources, including processing time and memory.

Thus, while the user experience could be made easier by automatically converting a simple syntax to the complex equivalent to address user error, such a solution does not improve the computing resources or query complexity which are provided by the invention.

A new searchable region (metadata field) which logically contains the minimum or maximum values of all the metadata regions of interest could also be created. As items are added to the index, removed from the index, or modified, the value contained in the minimum or maximum field would be reassessed and updated. The resulting query would be easier for the user to create, and fast to execute. However, this approach has several drawbacks. Firstly, there is a performance penalty during indexing to update these fields. Secondly, there is a size/space penalty in the index—since a new region must be maintained along with storage of values and associated index structures. More importantly, the administrator of the system must know a priori which minimum or maximum field definitions need to exist, and only those pre-configured scenarios may be used.

What is needed, therefore, are systems and methods that allow simple specification of searches of multiple regions for maximum or minimum values and that efficiently implement such searches.

To those ends, among others, embodiments as disclosed may provide a search operator that addresses the problem of complex query construction for finding objects having a minimum or maximum value in a set of regions. These search operators may allow the specification of minimum search or a maximum search. Such searches may specify a minimum (min) search or a maximum (max) search, a set of regions to be searched, and a search value including a comparator to utilize (e.g., >, <, =, <=, >=, !=, etc.) and a value. In effect, these search operators may be used to construct a synthetic region type in a search engine. In other words, a region that may not be indexed or stored in the metadata for documents in a content management system. Such a synthetic region may be a multi-source region that is made up of one or more traditional regions (e.g., regions that are indexed or whose values are otherwise stored in the metadata (or otherwise) for a document in the content management system. Thus, values for the synthetic region are not stored explicitly, rather they are determined by the underlying regions.

Thus, for example, for a maximum search the search operator syntax may be as follows:

Maximum
[max r1, r2, r3]>x
Equivalent to: r1>x OR r2>x OR r3>x
(same for >=e.g., r1>=x OR r2>=x OR r3>=x)
[max r1, r2, r3]<x
Equivalent to: ((r1<x or r1 is NULL) AND (r2<x or r2 is NULL) AND (r3<x or r3 is NULL)) AND (r1<x OR r2<x OR r3<x)
(same for <=)
[max r1, r2, r3]=x
Equivalent to: ((r1<=x or r1 is NULL) AND (r2<=x or r2 is NULL) AND (r3<=x or r3 is NULL)) AND (r1=x OR r2=x OR r3=x)
[max r1, r2, r3]!=x
Equivalent to: (r1!=x AND r2!=x AND r3!=x) OR (r1>x OR r2>x OR r3>x)

For a minimum search the search operator syntax may be as follows:

Minimum
[min r1, r2, r3]<x
Equivalent to: r1<x OR r2<x OR r3<x
(same for when the comparator is <=, e.g., r1<=x OR r2<=x OR r3<=x)
[min r1, r2, r3]>x
Equivalent to: ((r1>x or r1 is NULL) AND (r2>x or r2 is NULL) AND (r3>x or r3 is NULL)) AND (r1>x OR r2>x OR r3>x)
(same for >=)
[min r1, r2, r3]=x
Equivalent to: ((r1>=x or r1 is NULL) AND (r2>=x or r2 is NULL) AND (r3>=x or r3 is NULL)) AND (r1=x OR r2=x OR r3=x)
[min r1, r2, r3]!=x
Equivalent to: (r1!=x AND r2!=x AND r3!=x) OR (r1<x OR r2<x OR r3<x)

Thus, embodiments as disclosed may provide a simple syntax for users in the instance where a user desires to search for a minimum or maximum value in a set of regions that may (or may not be) sparsely populated. In certain embodiments, a maximum region will only match for a given object if the maximum value of all the set of regions (that have a value) for that particular object matches the query, likewise a minimum region requires the minimum of the values of the set of regions to match for any given object. As an example, an equivalent query to the 5 year date query discussed above utilizing embodiments as contemplated herein would be:

[min created,modified,embedded,record,system]>-5y

Accordingly, one benefit to using a maximum or minimum region operator according to embodiments (over traditional regions or searches) is the (lack of) complexity of the resulting query. Without maximum and minimum regions the queries become quite complex and tedious to compose. The maximum and minimum regions are also able to return the matching value in a select statement, which would require all underlying regions to be returned and post processing with the traditional query. Of note, here, embodiments may not simply transform this syntax into a functional equivalent to reduce user error. Embodiments may permit ad hoc query construction on any combination of searchable regions without requiring pre-configuration.

Embodiments as presented herein may thus have a number of advantages. By implementing such a region value search, the search problem of searching a set of regions that may be sparsely populated may be solved efficiently at the process and search tree level as opposed to at the query level (e.g., by expanding such a query manually, or expanding it through automatic syntax rewriting). Accordingly, embodiments may avoid the need to execute such huge queries and provide many technical improvements in the functioning of the computer when applying such region value searching, including the use of fewer computer resources such as disk accesses, memory or processor cycles and reducing the time needed to execute such a search. Moreover, embodiments of such search operators may be usefully applied in a variety of contexts.

Additionally, embodiments as disclosed may improve the functioning of a computer, both from a processing efficiency standpoint, a speed standpoint and a computer resource usage standpoint by utilizing fewer (and faster) processes that reduce time of execution, number of compute cycles required for execution and memory usage required for execution. Moreover, embodiments may also implement the minimum and maximum functions more efficiently than their optimized fully expanded equivalents. To illustrate, in the example above, the optimal fully expanded query requires 24 iterators, or 5n−1 (where n is the number of regions). The new minimum operator performs the same query using only 2n (or 10) iterators. This reduction in iterators allows a search query to function using fewer resources, such as CPU memory, which in turn can reduce the cost of the solution or permit more complex operations to complete within an available CPU and memory budget.

Generally, then the number of iterators required for different permutations of the minimum and maximum (min/max) region operators may be as follows and are presented in comparison with the number of iterators typically required for such a search previously:

|  | Maximum Search | | Minimum Search | |
| --- | --- | --- | --- | --- |
|  | Previously | Embodiments | Previously | Embodiments |
| < (or <=) | 5n − 1 | 2n | 2n − 1 | n |
| > (or >=) | 2n − 1 | n | 5n − 1 | 2n |
| = | 5n − 1 | 2n | 5n − 1 | 2n |
| != | 4n − 1 | 2n | 4n − 1 | 2n |

Moreover, embodiments may also be utilized to return the region or regions used in matching the query. From a functionality and usability standpoint, embodiments may also have the advantage of simplicity: users are more likely to construct a useful and meaningful search when a simple operator for their desired functionality is available, as opposed to having to construct long and complicated manual queries.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIGS. 1A and 1B depict example search trees.

FIG. 1C depicts one example of a search tree for an example use of a region value operator.

FIGS. 8A and 8B are tables illustrating example data.

DETAILED DESCRIPTION

Figure 2A:
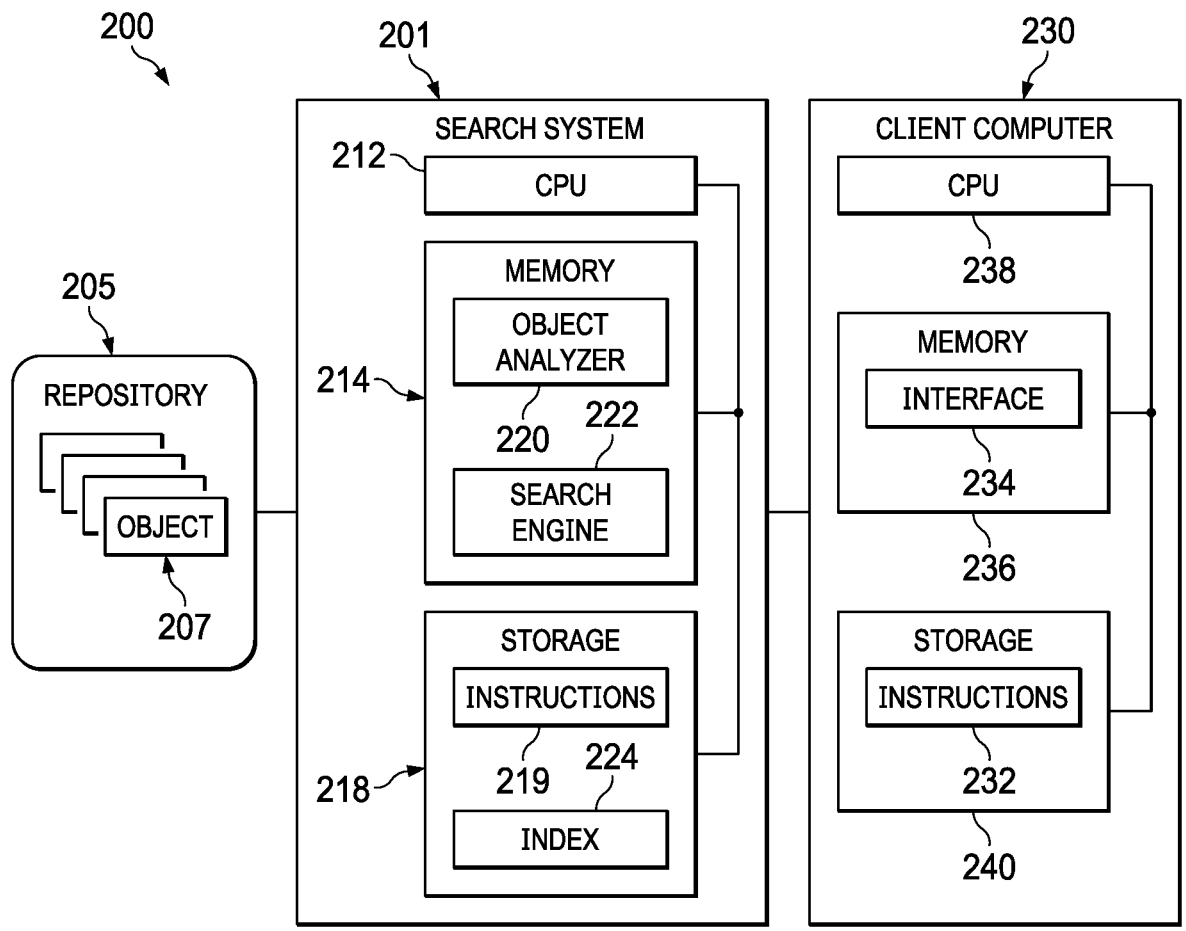
FIG. 2A is a block diagram of one embodiment of an architecture including a search system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

As discussed, certain areas have, however, proved difficult to the application of searches. Examples of such searches involve searches of certain fields (or regions) where the fields may, or may not, exist for particular documents within the corpus. For instance, in many content management systems the documents (objects) may have many different fields (e.g. metadata fields) associated with each document. Often times these regions are sparsely populated and may have similar or related meanings.

Generally, then, when employing search in association with such systems that may maintain regions, figuring out the meaningful regions to search and which to search may be difficult as these fields may or may not exist or be populated with respect to different documents in the corpus. In particular, when a set of related regions may be present in association with each object, it may be desired to search the regions based on a desired maximum or minimum value for the set of regions such that if an object has regions present (e.g., a value populated for that region), it will be these values that will be utilized to evaluate the responsiveness of that object to the search to determine if all the values in the regions meet the desired minimum or maximum value.

As traditional search systems do not support the ability to conduct these types of searches, to implement a search of this type in a traditional search system, a user must construct a search query that explicitly enumerates each of the possible alternatives. This enumeration process is complex and not easily understood or accomplished by most users. Moreover, these searches (even when optimized) tend to be inefficient. Accordingly, the implementation of a search according to such search queries by typical search engines may consume large quantities of time, memory or other computer resources and may need on the order of 5n−1 terms to evaluate.

Moreover, in actual practice, a search query may have many other criteria (dates, metadata values, other text terms, etc.). As one can imagine, creating search queries for more complex scenarios will quickly exceed a (searching) user's capacity to easily and correctly build a search query. Some of the problems arise in no small part because in a binary tree approach to implementing a search, each binary operator of the search tree may be a node that includes two sub-nodes, where each of these sub-nodes may be either another operator node or may include a search term node (e.g., as a leaf node). Thus, traditional search engines construct search trees made up of unary or binary iterators in the tree and term iterators at the leaves of the tree. Each term iterator's scope is limited to one term and each binary operator process is limited to two terms. Such constraints lead to extremely complex queries, even for a small number of terms.

Accordingly, the implementation of such search queries by typical search engines may consume large quantities of time, memory or other computer resources. In some cases, for certain queries, the resources required for a particular query may exceed the computing resources available or may require that certain computing resources by taken off-line and dedicated to the search in order to complete such a search. At least in part, this situation may result from the manner in which these types of searches are implemented by typical search engines. As mentioned, most search engines function by evaluating a search using a binary tree approach where binary search operators are involved. To illustrate in more detail, almost all search engines (e.g., full text search engines) maintain an index. This index may include, for example, an inverted copy of the indexed information. So, for example, assume that the corpus of documents being indexed includes three documents with the following values in a "Name" region:

Object 1—"Water, Rivers and Lakes"
Object 2—"Rivers, Dams and Rainfall"
Object 3—"Rivers and Ponds"

For the above example an inverted index (also called the posting list) for the "Name" region may look similar to:

And—1, 2, 3
Rivers—1, 2, 3
Lakes—1
Rainfall—2
Ponds—3
Water—1
Dams—2

Such an index indicates that the term "And" appears in objects 1, 2 and 3, the term "rivers" appears in objects 1, 2 and 3, the term "lakes" appears in object 1, the term "Ponds" appears in object 3, etc.

FIG. 1A depicts a representation of an example search tree for the search "(stream AND pond AND lake AND river AND water)". Here, each term node 102 represents a process that searches, determines and provides objects of the corpus that includes the labeled term. In other words, a process may access the index to determine which objects of the corpus include that search term. For example, term node 102a represents access to the index to identify objects that include the term "stream". Similarly, term node 102b represents access to the index to identify objects that include the term "pond." Operator node 104a represents a process that will union or otherwise combine the objects returned by the process associated with term node 102a and the process associated with term node 102b to determine the objects that contain both the term "stream" and the search term "pond". As can be seen, the search "(stream AND pond AND lake AND river AND water)" requires at least five term processes 102 for the search terms and four binary operator processes 104 for each of the operators.

As can be imagined from the depiction of this simple search, the associated number of processes, associated computer power, memory, time, etc., quickly become untenable when discussing search queries like those enumerated above for sets of regions. To illustrate further, FIG. 1B is a block diagram depicting a representation of an example search tree for the search "(stream AND pond AND lake AND river AND water) OR (creek AND pond AND lake AND river AND water)". As can be seen, the size and complexity of the search tree may grow rapidly based on the number of operators or permutations involved in the search, despite that the number of actual terms involved (e.g., water, river, lake, pond, stream, creek, rain, rainfall, dam) may be constant and relatively few in number.

Embodiments as disclosed herein may address these deficiencies and disadvantages by allowing simple specification of searches of sets of regions for a minimum or maximum value and efficient implementation of such searches. Specifically, embodiments as disclosed may provide a search operator (generally referred to as a region value search or operator, a min/max search or operator or minimum or maximum search or operator) that addresses the problem of complex query construction for finding objects having a minimum or maximum value in one of a set of regions.

In other words, according to certain embodiment, a min/max search may specify a set of regions and a search value including a comparator and a comparison value. Such a search can determine based on any values present in the set of regions if one or more of those values makes the comparison (e.g., as defined by the comparator) with the comparison value true. Moreover, embodiments as disclosed herein may efficiently implement the searches specified by such min/max operators using a region value process that combines results from a set of region processes where a maximum of two processes may be needed for each region in the set of regions.

Embodiments of this region value operator may take almost any form desired and be utilized with other operators traditionally used with search queries as are known in the art. The region value operator may also utilize almost any syntax desired to specify a search for finding objects having a minimum or maximum value in one of a set of regions. Accordingly, region value search operators may also be provided in certain embodiments that allow region set of regions to be dynamically defined at the time of the search by the user. These search operators may allow the specification of minimum search or a maximum search. Such searches may specify a minimum (min) search or a maximum (max) search, a set of regions to be searched, a comparator to utilize (e.g., $>$, $<$, $=$, $<=$, $>=$, $!=$, etc.) and a value. These search operators may be used to construct a synthetic region type in a search engine. In other words, a region that may not be indexed or stored in the metadata for documents in a content management system. Such a synthetic region may be a multi-source region that is made up of one or more traditional regions (e.g., regions that are indexed or whose values are otherwise stored in the metadata (or otherwise) for a document in the content management system.

Here, values for the synthetic region may not be stored explicitly, rather they are determined by the underlying regions.

Thus, for example, for a maximum search the search operator syntax may be as follows:

Maximum

[max r1, r2, r3]$>$x

Equivalent to: r1$>$x OR r2$>$x OR r3$>$x (same for $>=$)

[max r1, r2, r3]$<$x

Equivalent to: ((r1$<$x or r1 is NULL) AND (r2$<$x or r2 is NULL) AND (r3$<$x or r3 is NULL)) AND (r1$<$x OR r2$<$x OR r3$<$x)

(same for $<=$)

[max r1, r2, r3]$=$x

Equivalent to: ((r1$<=$x or r1 is NULL) AND (r2$<=$x or r2 is NULL) AND (r3$<=$x or r3 is NULL)) AND (r1$=$x OR r2$=$x OR r3$=$x)

[max r1, r2, r3]$!=$x

Equivalent to: (r1$!=$x AND r2$!=$x AND r3$!=$x) OR (r1$>$x OR r2$>$x OR r3$>$x)

For a minimum search the search operator syntax may be as follows:

Minimum

[min r1, r2, r3]$<$x

Equivalent to: r1$<$x OR r2$<$x OR r3$<$x (same for $<=$),

[min r1, r2, r3]>x
Equivalent to: ((r1>x or r1 is NULL) AND (r2>x or r2 is NULL) AND (r3>x or r3 is NULL)) AND (r1>x OR r2>x OR r3>x)
(same for >=)
[min r1, r2, r3]=x
Equivalent to: ((r1>=x or r1 is NULL) AND (r2>=x or r2 is NULL) AND (r3>=x or r3 is NULL)) AND (r1=x OR r2=x OR r3=x)
[min r1, r2, r3]!=x
Equivalent to: (r1!=x AND r2!=x AND r3!=x) OR (r1<x OR r2<x OR r3<x)

In some embodiment, pre-defined or static synthetic min or max regions may be created before search time using the search system. Any number of methods are possible, including APIs or special operators. For one implementation specification of a synthetic region in a configuration file may be allowed, as, for example:

MAXIMUM maxRegion region1 region2 region3

A user can then construct a query using the synthetic region named maxRegion. The equivalent in one embodiment of a query language would be:

[region maxRegion]>25

The dynamically defined and static synthetic min/max regions may behave substantially identically from a search perspective. It should be noted that in both cases, no additional physical region may be created; thus there may be no penalty on a search index for a stored value or associated index. In addition to searching for values, it is possible to retrieve values from the search index. For example, a search command:

SELECT region1, region2, region3 WHERE [max region1, region2, region3]>25
would perform the search to find objects where the maximum values of the three regions is greater than 25, and it would also return the values of each region. Such capabilities may allow the user (or an application invoking the search) to inspect the regions and determine which one had the maximum value that matched the query.

When a synthetic minimum or maximum region is pre-defined (e.g., static), then one advantage may be that the effective maximum or minimum value that satisfied the query can be returned in the search results. For example:

SELECT maxRegion WHERE [region maxRegion]>25
may return only the maximum value of the regions that satisfied the query. This in turn can potentially simplify the user comprehension of the search results, or reduce the complexity of an integrated application that would otherwise need to extract the maximum value from each of the regions. An example of an alternative syntax that could achieve the same result, but was not implemented initially, may be to include the min or max definitions directly in the SELECT portion of the query, along these lines:

SELECT [min region1, region2, region3] WHERE [min region1,region2,region3]<="roger"

By implementing such searches as described above using a region values process, the region value search problem may be solved efficiently at the process and search tree level as opposed to at the query level (e.g., by expanding the query automatically or constructing such a query manually). Thus, using such a region value process, region value searching may be implemented in a manner that would be impossible to do at a query construction level. For example, even in the most simplified case, a conventional manually constructed query will require on the order of 2n−1 iterators. Using a region value process, only n iterators may be required in such a simplified case, both speeding up the search and reducing the computation resources required to implement such a search.

Accordingly, embodiments may avoid the need to execute such huge queries and provide many technical improvements in the functioning of the computer when applying such region value searching, including the use of fewer computer resources such as disk, memory or processor cycles, and may require less time to execute. Moreover, embodiments of such search operators may be usefully applied in a variety of contexts.

Before describing embodiments in detail, it may be helpful to discuss an example of a search system. FIG. 2A depicts a block diagram illustrating an example of computing environment 200 having object repository 205, search system 201, and client computer 230. Object repository 205 may comprise a file server or database system or other storage mechanism remotely or locally accessible by search system 201. Object repository 205 may store objects 207 (e.g., documents, images, emails or other objects) that may be searchable by search system 201.

In the embodiment of FIG. 2A, search system 201 comprises a server having central processing unit 212 connected to memory 214 and storage unit 218 via a bus. Central processing unit 212 may represent a single processor, multiple processors, a processor(s) with multiple processing cores and the like. Storage unit 218 may include a non-transitory storage medium such as hard disk drives, flash memory devices, optical media and the like. Search system 201 may be connected to a data communications network such as the Internet, a local area network (LAN), a wide area network (WAN), a cellular network or some other network or combination of networks.

Storage unit 218 stores computer executable instructions 219 and index 224. Computer executable instructions 219 can represent multiple programs or operating system code. In one embodiment, instructions 219 are executable to provide object analyzer 220 and search engine 222. Object analyzer 220 and search engine 222 may be portions of the same program or may be separate programs. According to one embodiment, for example, object analyzer 220 is a component of a document management system or content management system while search engine 222 is a separate program that interfaces with the document or content management system. Furthermore, object analyzer 220 and search engine 222 can be implemented on different computing systems and can, themselves, be distributed.

Index 224 may include metadata used to identify objects in response to a search query and may also include text used to identify objects. Specifically, as discussed above the index 224 may include an inverted copy of the indexed object. An inverted index may therefore contain a set of terms along with the an identification of which objects contain those terms Index 224 can include a single index containing metadata and text, separate metadata and text indexes or other arrangements of information. While shown as a single index, index 224 may include multiple indices. Further, index 224 may be partitioned, with different objects being represented in each partition.

Client computer system 230 may include components similar to those of the server of search system 201, such as CPU 238, memory 236, and storage 240. Additionally, client computer system 230 may include executable instructions 232 to provide user interface 234 that allows a user to enter a search query. These instructions 232 may have, for example, been provided by search system 201 in response to an access by client computer 230. User interface 234 may be provided through a web browser, file system interface or other program.

Those skilled in the art will appreciate that search system 201 shown in FIG. 2A is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 230 may include any suitable desktop computer, laptop, mobile device, server or other computing system.

In operation, object analyzer 220 may analyze objects in object repository 205 to determine information to be indexed in index 224. When an object 207 is added to search system 201, two types of information are generally indexed, one or both full text and metadata. As an example, suppose object 207 being added to search system 201 is a text file. The text or content of the file is indexed as well as information about the file. In some cases, the metadata itself may include important information associated with the object 207. This metadata may need its own descriptive metadata indicating attributes of the metadata. In some cases, the metadata on its own without full text content is sufficient to represent an object. Object analyzer 220 can send indexing instructions to search engine 222 to direct search engine 222 to add, modify, or delete metadata or text in index 224.

Object analyzer 220 may be a portion of a larger program, such as a document or content management program, may be a separate program or may be implemented according any suitable programming architecture. In one embodiment, the process of determining metadata and text to be indexed may be carried out by any number of different programs on a computer system or distributed across computer systems. Detailed discussions concerning an example of an object analyzer can be found in U.S. patent application Ser. No. 13/595,570, filed Aug. 27, 2012, entitled "SYSTEM AND METHOD OF SEARCH INDEXES USING KEY-VALUE ATTRIBUTES TO SEARCHABLE METADATA," which is fully incorporated by reference herein.

When a search query is received at search system 201, search engine 222 can search the information in index 224 to identify objects (content) 207 responsive to the search query and return a list or other representation of those objects 207 to client computer 230.

Figures 2B, 4:
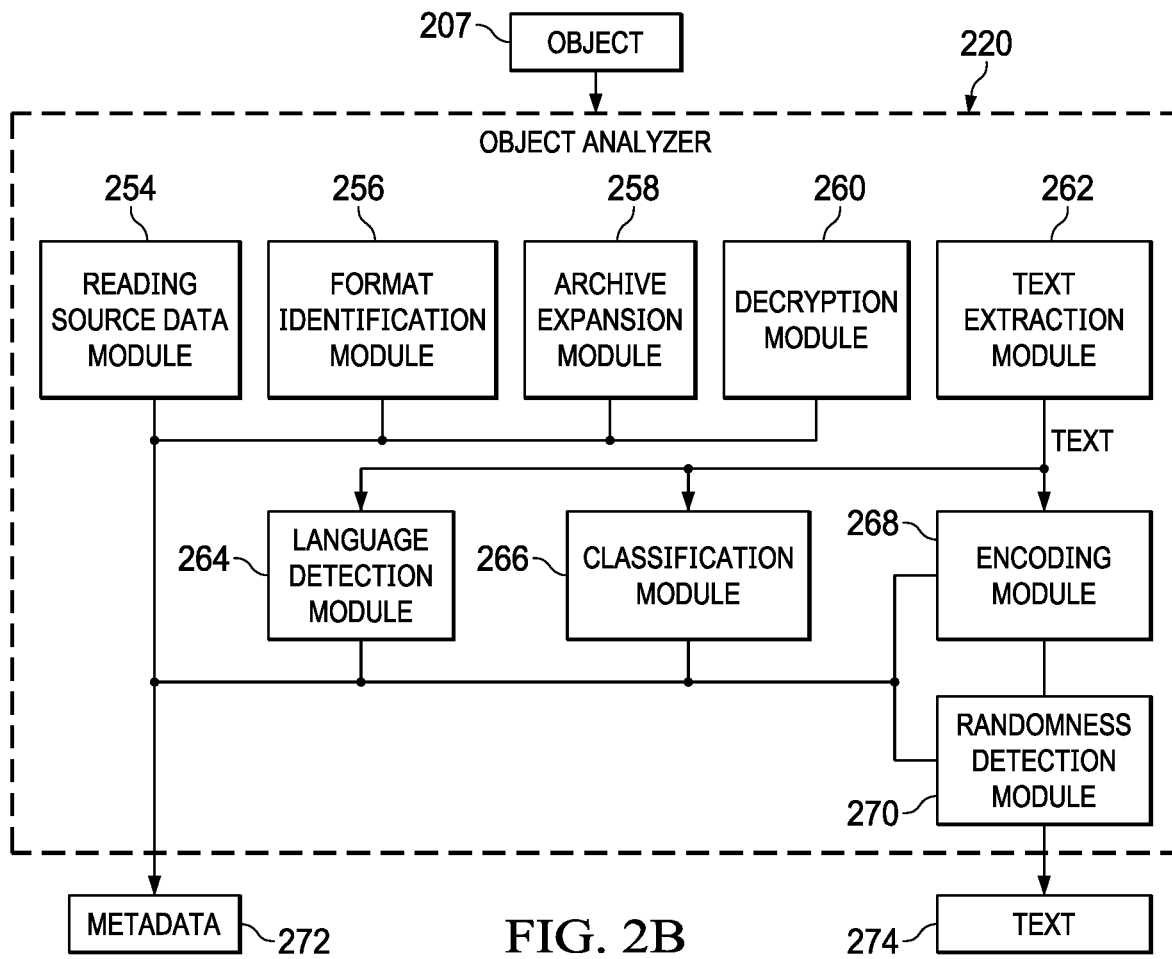
FIG. 2B is a block diagram of one embodiment of an object analyzer.
FIG. 4 is a block diagram of one embodiment of regions or fields for a portion of an index.

FIG. 2B depicts a diagrammatic representation of one embodiment of an object analyzer 220 for analyzing an object 207. Object analyzer 220 can comprise various modules to process an object 207. Reading source data module 254 can open the object 207. Format identification module 256 examines the object to determine what type of file or data the object 207 comprises. Archive expansion module 258 unzips files or otherwise decompresses files if the object 207 is a compressed file. Decryption module 260 decrypts all or part of the data in the object 207. Text extraction module 262 applies rules to text in the object 207 to extract text for index 224. Language detection module 264 examines the text to determine the language in which the text is written. Classification module 266 applies rules based upon text and metadata to classify content. Encoding module 268 can convert text to a supported encoding. Randomness detection module 270 can analyze data to be indexed to reject random information.

Object analyzer 220 may include modules that can derive metadata for object 207. For example, a document management system may provide a limited amount of metadata with the object 207. Object analyzer 220 can derive other metadata from the metadata provided, text or other properties of the object 207. As a specific example, a filter or piece of code that extracts the text from a PowerPoint presentation might also create metadata about the presentation. In this example, the metadata which is not provided by the document management system and which is derived by object analyzer 220 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2B is provided by way of example. Object analyzer 220 may include any number of other modules to analyze an object and extract text 274 and metadata 272 to be indexed. Object analyzer 220 may be a portion of a larger program, such as a document management program, may be a separate program or may be implemented according any suitable programming architecture. In one embodiment, the process of determining metadata 272 and text 274 to be indexed may be carried out by any number of different programs on a computer system or distributed across computer systems.

Figure 3:
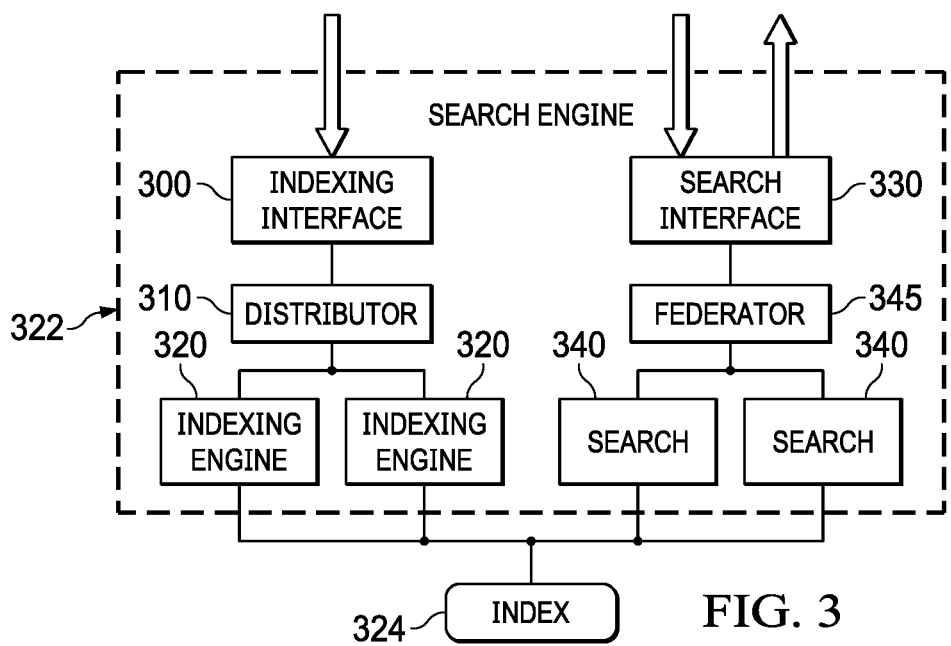
FIG. 3 is a block diagram one embodiment of a search system.

Metadata 272 and text 274 thus processed by object analyzer 220 may be provided to a search engine. An example search engine will now be described with reference to FIG. 3. Specifically, FIG. 3 depicts a diagrammatic representation of logical blocks for one embodiment of search engine 322. Search engine 322 may provide indexing interface 300 that receives indexing requests (e.g., from object analyzer 220) or another source. A distributor module 310 may distribute the indexing requests to indexing engines 320 that act on the indexing requests to update index 324. Search engine 322 may also include search interface 330 to receive queries (e.g., from a user, a content server or other source). Search interface 330 may send queries to search modules 340. These queries may be sent or distributed through federator 345 which may serve as a coordinator for the search modules 340. Each of the search modules 340 may be a search process configured search the corpus based on a related search term.

The coordinator may determine search modules (processes) 340 to instantiate based on the terms of the received query and instantiate those search modules 340. For example, the coordinator may define the search modules 340 and a hierarchy in order to define a search tree of the search modules 340 corresponding to the received query. The coordinator may then instantiate search modules 340 and provide each module 340 with the data (e.g., related sub modules 340, search term for the search module 340, etc.) needed to process the search tree. The federator 345 may then obtain results from one or more of the search modules 340 (e.g., the search module 340 that is a root node of the search tree) and generate a response to the query received through search interface 330. This response may identify one or more responsive objects. Search modules 340 are responsible for implementing a term process for one or more terms using index 324 or implementing an operator process for a search operator, a match iterator for matching a value, an alternative iterator, a value iterator for all values in a region, performing searches on an index partition, and performing tasks such as computing relevance score, sorting results, and retrieving metadata regions to return in a query. Thus, a search tree may include a set of hierarchically arranged search modules 340 as nodes of the search tree, each search module 340 being a term process or an operator process.

Search interface 330 may be configured to receive a search query from a user, and search index 324 for objects that meet the criteria set forth in the search query. Query languages may also be configured to permit sorting results of a search. Various rules may be used to determine the sort order. While users construct a search query, it should be noted that the user could be any system that issues queries to the search system, and may include other computer programs searching on behalf of other users, creating reports or running automatic processes. Additionally, as described above, there can be many different types of metadata in the search index. Thus, the search queries are not restricted to "text" based search terms.

In the context of this disclosure, the phrase "search term" represents a technical concept or interpretation. For example, a search term in the context of this disclosure can be a word, a string, or any combination of the following: phrases, numbers, strings, logical operations (e.g., AND, OR, NOT, SUBSET, STEM, etc.), ordering or operations (e.g., using parentheses), relationships (e.g., greater than, less than, not equal to, etc., similarities based on thesaurus, stemming, sounds-like, etc., wildcards and pattern matching or the like. To this end, a search term can also refer to any term that is used in a query and that has been modified or generated by any commonly used techniques. For context, a search term could be a word "john" or a more complex expression like:

(>"bob" or !=("123" or a*)) and (sounds-like "smith" or thesaurus "doctor" or "medical doctor" or stem "medical").

The embodiment of FIG. 3 is provided by way of example. Search engine 322 may include any number of other modules or configurations to update and search index 324. For example, search modules 340 and indexing engines 320 may be a single module. Search engine 322 may be a portion of a larger program, such as a document management program or content management system, may be a separate program or may be implemented according to any suitable programming architecture. Furthermore, the processes of search engine 322 may be distributed across multiple computer systems. Additionally, while in FIG. 3, index 324 is illustrated as a single index, index 324 may comprise a set of smaller indexes. For example, a separate index can be used or updated by each indexing engine FIG. 4 depicts a diagrammatic representation of one embodiment of regions or fields for a portion of index 324. Index 324 includes a list of some or all objects 207 in repository 205 (FIG. 2A), each identified by a unique identifier 401 (also referred to as object ID). Index 324 further includes a set of metadata regions 400 (also referred to as metadata fields). A metadata field 400 may include more than one entry for an object. The metadata fields can each have associated values in value storage locations within storage unit 218. In other embodiments, the values may be discarded. The index may include a list of dictionary terms contained in the metadata values of the object and pointers to where the metadata values corresponding to the field are stored. Index 324 may also include other regions for an object, such as a text region 402. Text region 402 may, for example, include a list of terms in the text of an object. Index 324 may include some or all of the content of an object.

While shown as a single index, index 324 may be partitioned. In index partitioning, in one embodiment, the index of objects in repository 205 may be split into multiple indexes such that some objects are listed in one index partition, while other objects are listed in the other index partitions. As described below with reference to FIGS. 5 and 6, a 'partition' comprises a portion or fragment of index 324 and is associated with indexing engine 320 and search module 340. Note that it is possible to copy a partition and associate a different index engine and search engine with this copied partition. Index partitioning may also reduce resource usage and search time. Furthermore, separate indexes may be maintained for metadata and text or different metadata regions or fields. Index 324 can be stored according to any suitable storage scheme. Example storage schemes may include "Memory Storage," "Disk Storage" and "Retrieval Storage":

Memory Storage: in this storage scheme, all the elements of the index are kept in memory. This provides the fastest operation when search results must be retrieved, since the memory storage mode minimizes disk activity. Conversely, memory storage consumes the most memory in partitions. For example, text regions which are frequently searched and retrieved for display may be held in memory.

Disk Storage: in this storage scheme, the dictionary and index are kept in memory, but the value storage is located on disk within a Checkpoint file. Keyword searches are still fast, but search queries which need to examine the original data, such as phrase searches, are generally slower. Retrieving values from disk for display is also slower. For regions which are not commonly searched and displayed, disk storage may be a desirable choice. Disk storage is also suitable as a storage mode for systems utilizing solid state hardware.

Retrieval Storage: in this storage scheme, storage is optimized for text metadata regions which need to be retrieved and displayed, but do not need to be searchable. As an example, text values may be stored on disk within the Checkpoint file, and there is no dictionary or index at all. This storage scheme can be used, for example, for regions such as Hot Phrases and Summaries.

Figure 5:
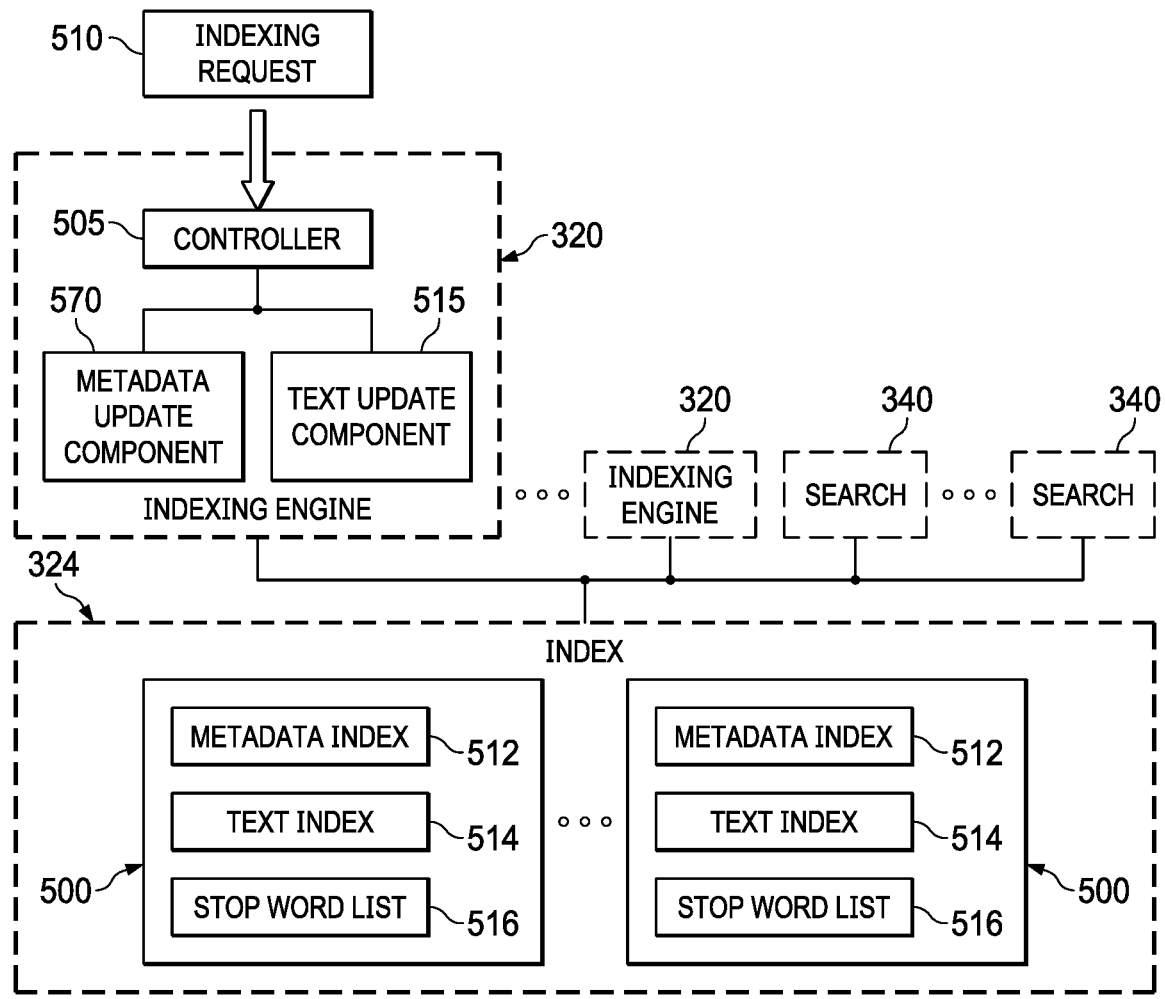
FIG. 5 is a block diagram of one embodiment of an indexing engine.

FIG. 5 depicts a diagrammatic representation of one embodiment of an indexing engine 320 to maintain a partition of index 324. Here, for example, index 324 is divided into "n" partitions 500, with each partition including a metadata index 512, a text index 514 indexing a portion of the objects of the corpus and a stop word list 516 for each based on the objects of the corpus of objects associated with that partition 500 of the index 324 or all partitions 500 of the index 324. Thus, each stop word list 516 may be specific to the objects of the corpus associated with that partition. A stop word list 516 may be created at some time interval or based on some other condition. In this embodiment, indexing engine 320 can include an indexing controller 505, a metadata update component 570, and a text update component 515. In this embodiment, index 324 is maintained as a separate metadata index 512, which contains metadata for objects 207 in repository 205, and text index 514, which contains content text from objects in repository 205, with a known relationship between the text and metadata components for each object in the index.

Indexing controller 505 receives indexing requests (e.g., from a distributor, another application or other source). An indexing request 510 received at the indexing controller 505 may include an instruction to add an object, delete an object, modify an object or replace an object in index 324. Such an indexing request may also include the information to be added or changed, such as the full text content to be indexed and the associated metadata for the object. An indexing request may also contain derived metadata.

The text (derived text or full text content) of an indexing request 510 may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request 510 may specifically be provided by an application providing the indexing request. This might be data such as an identifier for the object, the date or time it was first added to the system, or the identity of the user who manages the object.

A portion of the metadata can be derived metadata. Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

An indexing engine can receive an indexing request 510 from an application, distributor or other source. Indexing request 510 specifies an operation to be taken on index 324 for an object and any metadata or text for that action. For context, an application that generates an indexing request may be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add. This function may distinguish between content and metadata. If an object already exists and metadata only is provided, the existing full text content is retained.

AddOrModify: this operation will update an existing object or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 505, according to one embodiment, is a component which interprets the indexing request 510 to determine how it should be processed. Indexing controller 505 can identify whether a text indexing command exists, and if so, send the command with the necessary parameters to the text update component 515. Indexing controller 505 can likewise determine if any metadata indexing operations are required, and if so, send the command with necessary parameters to the metadata update component 570.

Text update component 515 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object.

Metadata update component 570 is responsible for processing requests to index metadata 512 associated with an object in index 324. This may include building and maintaining dictionaries of search terms, maintaining internal search data structures, and updating the representation of the metadata portion of the search index in memory or on disk as appropriate. Metadata update component 570 may support instructions such as Add an Object, Replace an Object, or Delete an Object.

The embodiment of FIG. 5 is provided by way of example. Indexing engine 320 may include any number of other modules to update and search an index. Indexing engine 320 may be a portion of a larger program, such as a document management program, may be a separate program or may be implemented according any suitable programming architecture. In one embodiment, the processes of indexing engine 320 may be distributed across multiple computer systems.

As discussed above, an index may be partitioned. For example, in order to scale to large sizes, the search index may be broken into partitions. When new objects are added to the search index, a method of determining which partition should be the recipient of the new data is required. For example, one strategy may include allocating partitions based on a modulus of an object identifier (ID). As another example, a round-robin technique may be used to add new objects to partitions which have available capacity. One skilled in the art of computing will understand that there may be many possible strategies.

Figure 6:
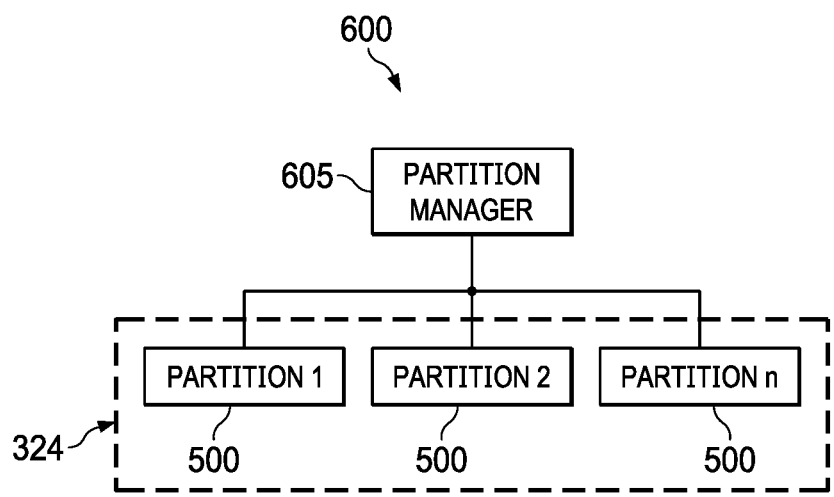
FIG. 6 is a block diagram of one embodiment of an index with multiple partitions connected to and being managed by a partition manager.

FIG. 6 depicts a diagrammatic representation of one embodiment of system 600 for managing partitions. In the embodiment of FIG. 6, index 324 is divided into "n" partitions 500, with each partition including a metadata index and a text index. As illustrated in FIG. 5, in one embodiment, each partition can have its own indexing engine 320 and search module 340.

A partition manager can be configured to manage these partitions. Partition manager 605 is a component of a search system that accepts indexing requests, determines which partition should service an indexing request, and provides the indexing request to the appropriate indexing engine 320. In one embodiment, partition manager 605 can be a logical function of a search engine in the search system which, in turn, can be part of a document management system. In one embodiment, partition manager 605 can be a logical function of distributor 310 shown in FIG. 3. An indexing engine (e.g., indexing engine 320 shown in FIG. 3) for a partition performs the actual indexing operations of adding, deleting or modifying data in the partition. Likewise, partition manager 605 may be able to federate search queries to multiple search engines 340 associated with multiple partitions and combine the results. In one embodiment, this function of partition manager 605 may be incorporated in a federator (e.g., federator 345 shown in FIG. 3).

Returning then to FIG. 3, in one embodiment, a search module 340 may be implemented as an iterator. An iterator may be a process that returns a next object of the type of object for which the iterator is configured. Thus, an iterator may provide an interface or call (e.g., collectively referred to as a "next interface") to allow a requestor (e.g., another search module 340 higher in the search tree or the coordinator) to access the interface of that iterator and obtain the next object of the corpus that is responsive to the configuration of that iterator. An iterator may maintain a pointer or other indicator that maintains an identifier of the iterator's current position in the corpus such that it is the next responsive object in the corpus that is returned with each next call or a null indication (e.g., NULL, EOF, a maximum integer value, etc.) if the iterator has reached the end of the corpus without identifying a subsequent document responsive to the configuration of that iterator. An iterator may also be provided with a given object ID and be able to find a next object identifier starting with (e.g., inclusive of) with the provided object ID.

For example, a search term iterator for a term may provide a next interface that provides the next object (e.g., next object identifier) in the corpus that contains that search term. An operator iterator may provide a next interface that provides the next object in the corpus that meets the logical condition(s) specified by that operator with respect to the search terms associated with that operator. A match iterator may provide a next interface that can provide the next object in the corpus that has a match for a given value in a corresponding region. A match iterator may, for example, be configured with a comparator and a comparison value such that the next interface can provide the next object in the corpus that has a match for the give value in the corresponding region based on the comparator and the comparison value. An alternative iterator may be a match iterator that is associated with another match iterator that can provide the next object in the corpus that has a match for a given value in a corresponding region. A comparator and comparison value with which an alternative iterator is configured may be based on the comparator of the match iterator with which the alternative iterator is associated or, for example, the region value operator of the search term.

In one embodiment then, search interface 330 may allow a user to use a region value operator in a search query. This region value operator may take almost any form desired and be utilized with other operators traditionally used with search queries as are known in the art. The region value operator may utilize almost any syntax desired to specify a prioritized evaluation of the values for a set of specified regions against a value.

These search operators may allow the specification of minimum search or a maximum search. Such searches may specify a minimum (min) search or a maximum (max) search, a set of regions to be searched, a comparator to utilize (e.g., >, <, =, <=, >=, !=, etc.) and a comparison value.

These search operators may be used to construct a synthetic region type in a search engine. In other words, a region that may not be indexed or stored in the metadata for documents in a content management system. Such a synthetic region may be a multi-source region that is made up of one or more traditional regions (e.g., regions that are indexed or whose values are otherwise stored in the metadata (or otherwise) for a document in the content management system. Thus, values for the synthetic region are not stored explicitly; rather, they are determined by the underlying regions.

Such a region value term in a search may take the form of "region value operator"["set or regions"] "search value", where the "search value" includes a comparator (e.g., >, <, =, <=, >=, !=, etc.) and a comparison value. Thus, for example, for a maximum search the search operator syntax may be as follows:

Maximum
[max r1, r2, r3 . . . ]>x; [max r1, r2, r3 . . . ]>=x; [max r1, r2, r3 . . . ]<x; [max r1, r2, r3 . . . ]<=x; [max r1, r2, r3]=x; or [max r1, r2, r3]!=x For a minimum search the search operator syntax may be as follows:

Minimum
[min r1, r2, r3 . . . ]>x; [min r1, r2, r3 . . . ]>=x; [min r1, r2, r3 . . . ]<x; [min r1, r2, r3 . . . ]<=x; [min r1, r2, r3]=x; or [min r1, r2, r3]!=x Thus, embodiments as disclosed may provide a simple syntax for users in this situation. In certain embodiments, a maximum region operator will only match at a given object if the maximum value of all the regions at that particular object matches the search value (e.g., the comparison value according to the comparator). Likewise, a minimum region requires the minimum of the regions to match at any given object. Other variations on operators, syntaxes and uses are imaginable and contemplated herein.

If such a region value term with a region value operator is specified in a received search query, federator 345 may instantiate a search module 340 corresponding to the region value term or operator as a node in the search tree and a set of search modules 340 based on the regions of the received query. For example, federator 345 may define the search module 340 and a hierarchy in order to define a search tree of the search modules 340 corresponding to the received query (or the portion of thereof corresponding to the region value operator). The portion of the search tree defined by the federator 345 may include a region value operator search module 340 as a node in the search tree where that region value term or operator search module 340 has a match search module 340 and a value search module 340 as a sub-node for each region associated with the subset operator in the search query.

To illustrate an example, referring briefly back to FIG. 1C, a search tree for the region value search (e.g., search term) "[max FileModified, FileCreated, FormatDate, VersionCreated, DateManaged]<10 years" is depicted. Here, operator process 120 may be a region operator (e.g., "Max") process instantiated by search module 340. Each match iterator processes 130 and alternative iterator process 140 for each region may be an iterator search module 340 that is a sub-node of the operator search module 340 (e.g., implementing operator process 120). As will be discussed in more detail, here there may be a match iterator and alternative iterator corresponding to each region specified in the "max" region operator, where each match iterator 130 is configured according to the comparison value 10 years value and the comparator (<). Similarly, each alternative iterator 140 is configured with the comparison value 10 years but the comparator (>=). It will be noted that the search tree provided here is provided by way of illustrative example, as will be apparent from a review of this disclosure, other search trees for other instances of search trees for region value terms or operators may include fewer (or no) alternative iterators for regions, based for example on the comparator or region value operator utilized in a region value search.

Referring again to FIG. 3, in one embodiment, a region value operator search module 340 may be implemented as an iterator. As used in a search tree, such a region value iterator may have a number of sub-nodes, each sub-node corresponding to a match iterator and an alternative iterator for one of the regions specified by the region value operator in the original query. The region value iterator may have a set of regions and a search value including a comparator and a comparison value, such that the region value iterator will return an object (or identifier thereof) in response to a call to the next interface of the region value iterator if the values in the set of regions for the object are true for the comparison defined by the comparator, the comparison value and the region operator. Specifically, for a maximum region value operator with a set of regions, a search value including a comparator and a comparison value, a region value iterator may return an object if the maximum value in the set of regions for the object (if a value exists in those regions) are true for the comparison defined by the comparator, the comparison value and the region operator. For a minimum region value operator with a set of regions, a search value including a comparator and a comparison value, a region value iterator may return an object if the minimum value in the set of regions for the object (if a value exists in those regions) are true for the comparison defined by the comparator, the comparison value and the region operator.

Figure 7:
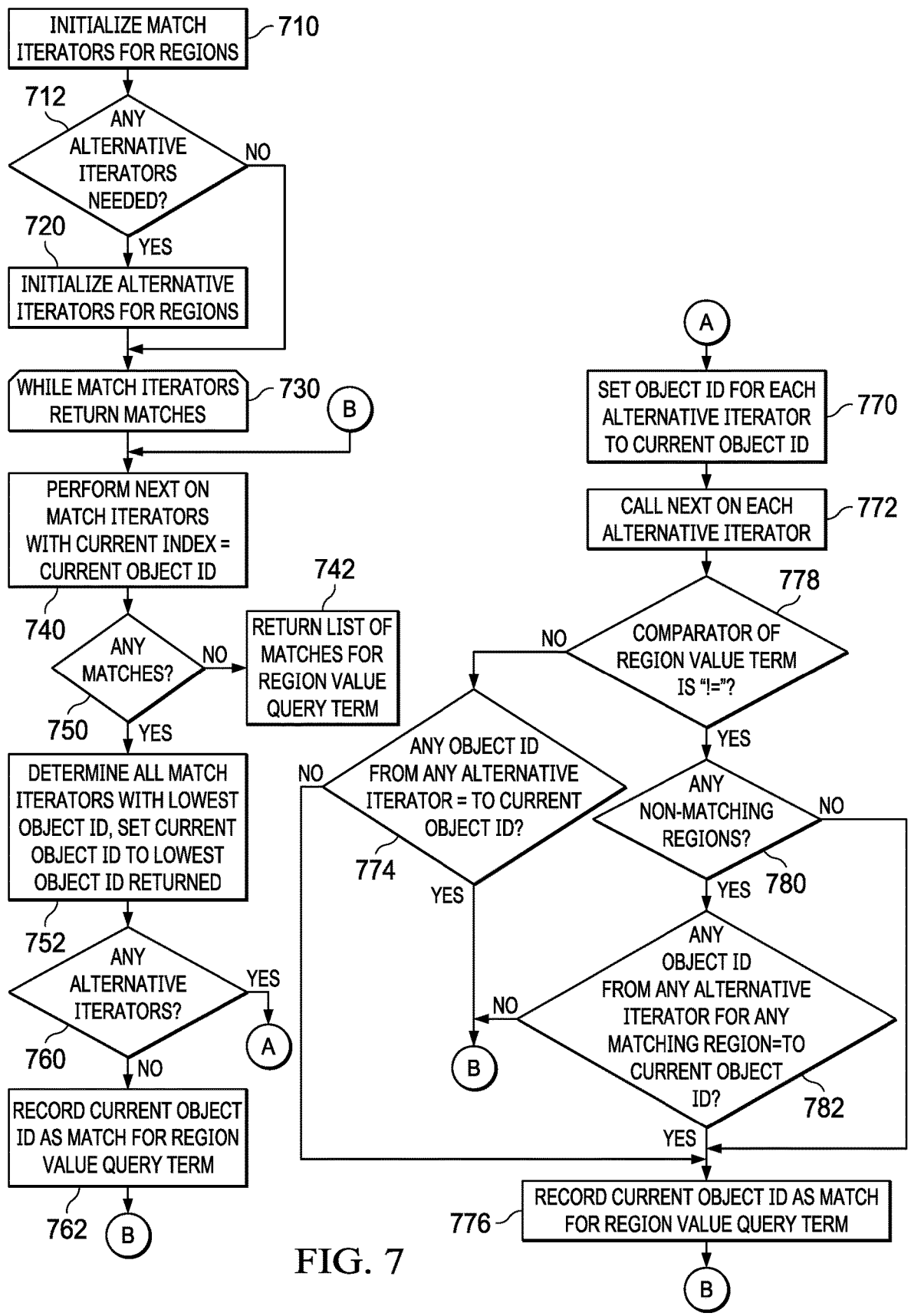
FIG. 7 is a flow diagram depicting one embodiment of a method for a region value iterator.

Referring now to FIG. 7, one embodiment of a method for a region value process (e.g., a region value iterator) is depicted. Such a region value process may, for example, be implemented when a search tree is created that for a search that includes a region value term. AS may be recalled, the regions value term may have a region value operator (e.g., minimum or maximum), a set of regions and a search value including a comparator and a comparison value. For purposes of explanation with respect to this embodiment, it will be noted that a region iterator employing the method of this embodiment will have some number of sub-nodes equal to the number of regions, each sub-node corresponding to a region identified in the set of regions of a region value operator of a query. Each sub-node includes a match iterator associated with the corresponding region and the comparator and comparison value specified in the search value of the region value operator. Each sub-node may also include an alternative iterator (e.g., a match iterator) configured with the comparison value and a different comparator. Each iterator has access to an index of a corpus of objects where each object is associated with an identifier. The identifiers of the objects in this embodiment may be sequential and each iterator may maintain an indicator of a current object (which may be initialized or set to a particular object identifier). An iterator returns the next document in the sequence in response to a call to the iterator's next interface if such an object exists, and an indicator that no more data remains otherwise (e.g., NULL, end, EOF, a max integer value for the system, a particular count, a value storing the last offset, simply running out of data, etc.).

For example, for a match iterator, the next document (if it exists) with a higher identifier than the current indicator (assuming the identifiers are increasing in value) with a value in the corresponding region that matches the value specified in the query may be returned in response to a call to a match iterator's next interface. Similarly, as an alternative iterator is a type of match iterator, for an alternative iterator the next object (if it exists) that has any value in the region associated with the alternative iterator (again assuming the identifiers are increasing in value) may be returned in response to a call to the alternative iterator's next interface. For purposes of illustration with this embodiment, it will be assumed objects have sequential numerical identifiers greater than zero. In other embodiments, objects may just have identifiers that are ordered and unique. It will be noted here, that when an iterator for a particular region is initialized to a particular value for an object identifier, such an iterator may return the next object that has any value in the particular region associated with the value iterator inclusive of the initialized object identifier. Other variations may be imagined, such as ordering the objects using link lists, trees, arrays, or in some other manner.

Accordingly, a search that includes a region value term may be received where the region value term may identify a region value operator, a set of regions and a search value including a comparator and a comparison value. This region value term may serve as the only term for a search or may be part of a larger search query. In either instance, a region value iterator may be created and provided with the region operator, the set of regions, and the search value including the comparator and the comparison value. A current indicator (also referred to as a current object identifier) of the region value iterator may also be set to zero. At step 710, the match iterators that are sub-nodes of the region value iterator may be created and initialized by setting the current object indicator of each of the match iterators to zero. There may be one match iterator for each region of the set of regions specified in the region value operator such that each match iterator is provided with the corresponding region and the search value including the comparator and the comparison value. Additionally, at step 712, it can be determined if an alternative iterators are needed for any of the match iterators for each of the set of regions. This determination may be made based on the region value operator (e.g., maximum or minimum) of the region value term or the comparator (e.g., >, <, =, <=, >=, !=, etc.) of the region value term.

Below is a table depicting information that may be used by a region value iterator to determine if any alternative iterators should be created, and if so, what comparator should be used to initialize such alternative iterators. As an example, with reference to the table, if the region value term has a "maximum" operator and the search value specifies "<" as the comparator, it can be determined that alternative iterators are needed and the comparator to use with such alternative iterators is ">=".

| | Maximum | | Minimum Search | |
|---|---|---|---|---|
| Operator Comparator | Alternative Iterators | Comparator | Alternative Iterators | Comparator |
| < (or <=) | Yes | >= (or >) | No | |
| > (or >=) | No | | Yes | <= (or <) |
| = | Yes | > | Yes | < |
| != | Yes | > | Yes | < |

When it is determined that alternative iterators are needed for match iterators (Y branch of step 712) the alternative iterators that are sub-nodes of the region value iterator may be created and initialized at step 720. There may be one alternative iterator for each region of the set of regions specified in the region value operator such that each alternative iterator is associated with the match iterator for the region and is configured with the determined comparator and the same comparison value as specified in the region value term. Additionally, the current object indicator of each of the alternative iterators may be set to zero.

Loop 730 may be performed until each of the match iterators return a max integer value (e.g., or NULL, EOF, etc.) in response to a call to their next interfaces. At step 740 then, the next interface of each match iterator whose current object indicator is equal to the current object indicator of the region value iterator may be called. As will be noted, in the initial iteration of the loop, with both the current object identifier of the region value and the current object identifiers for each match iterator initialized to an initial value (e.g., zero), the next interface for each match iterator may be called at step 740.

Each match iterator called will return an object identifier for the next object that has a value in the region corresponding to that match iterator that matched the search value (e.g., that returned true for a comparison with the comparison value based on the comparator) or alternatively a max integer value (or EOF, NULL, etc.) in the case no more objects have values in the corresponding region that match the search value. At step 750, it can be determined if all the match iterators have returned a max integer value, and if so, the region iterator may return the list of matching object identifiers for the region value query at step 742. If however, there is at least one match iterator that returns an object identifier in response to the next call (or that has a current object indicator that is not a max integer value), at step 752, the lowest object identifier for all the match iterators (and the match iterators that returned this lowest object identifier) may be determined. The current object indicator for the region value iterator can then be set to the lowest object identifier returned by all of the match iterators.

At step 760, once all the match iterators that returned (or whose current object indicator is equal to) the lowest object identifier are determined it can be determined if there are any alternative iterators associated with the set of regions. If there are no alternative iterators (N branch of step 760), it indicates that the values of the set of regions (e.g., as specified in the region value term) of the object associated with the lower object identifier meet the search value (e.g., comparator and comparison value) of the region value term. In this case, the current object indicator for the region iterator (equal to the current object identifier) may be added to a list of object identifiers for objects matching the region value term at step 762. The loop may then return to step 740 and the next interface of each match iterator whose current index value is equal to the current object identifier may be called.

If there are alternative iterators (Y branch of step 760) associated with the set of regions it can then be determined, for the object associated with the current object identifier, if a value exists in any region of the set of regions of the search that does not meet the region value operator and search value (e.g., comparator and comparison value) as specified in the region search term. In particular, the object identifier of each alternative iterator (or only those alternative iterators associated with a match iterator or region for which a match was not found in step 750) may be initialized to the current object identifier at step 770 and the next interface of each alternative iterator called at step 772. It will be noted here, that when the alternative iterator for a particular region is initialized to a particular value for an object identifier, such an alternative iterator may return the next object that has a matching value (e.g., based on the determined comparator and comparison value with which the alternative iterator was configured) in the particular region associated with the alternative iterator inclusive of the initialized object identifier. Thus, for example, if an alternative iterator for the "DateModified" region is initialized to object identifier "2", when the next identifier of this alternative iterator is called it will return object identifier "2" if the object associated with object identifier "2" has a value present in the "DateModified" region that is a matching value. It will also be noted that, in cases where the alternative iterator functions in a manner that is not inclusive of the initialized object identifier, each alternative iterator may be set to one less than the current object identifier (current object identifier—1) (again, in the example case of sequential object identifiers for the corpus).

In response to the next call to each alternative iterator, the object identifiers for the next object that has a matching value (e.g., based on the determined comparator and comparison value with which the alternative iterator was configured) in the particular region associated with the alternative iterator may be returned (if there any such objects, otherwise a maximum integer value, NULL, EOF, etc. may be returned). At this point, it can be determined if the comparator for the region vale search term was a "!=" comparator at step 778.

In cases where the comparator as specified in the region value search term was not a "!=" (N ranch of step 778), it can be determined if any of the object identifiers returned from any alternative iterator are equal to the current object identifier at step 774. If any alternative iterators returned an object identifier are equal to the current object identifier (Y branch of step 774) this indicates that a value exists in a region of the set of regions for the object that does not meet the region value operator and search value (e.g., comparator and comparison value) as specified in the region search term. No action may be taken here, and the loop may then return to step 740 and the next interface of each match iterator whose current index value is equal to the current object identifier may be called.

If, however, there are no alternative iterators that returned an object identifier equal to the current object identifier (N branch of step 774), it indicates that the values of the set of regions (e.g., as specified in the region value term) of the object associated with the current object identifier meet the search value (e.g., comparator and comparison value) of the region value term. In this case, the current object indicator for the region iterator (equal to the current object identifier) may be added to a list of object identifiers for objects matching the region value term at step 776. The loop may then return to step 740 and the next interface of each match iterator whose current index value is equal to the current object identifier may be called.

Returning then to step 778, of the comparator for the region value search term was "!=" (Y branch of step 778) it can be determined at step 780 if there are values for any of the set of regions of the object corresponding to the current object identifier that did not match the comparator and comparison value as specified in the region value search term. Here, that determination can be made by determining if any match iterator did not return the current object identifier. If there are no non-matching regions (N branch of step 780), the current object indicator for the region iterator (equal to the current object identifier) may be added to a list of object identifiers for objects matching the region value term at step 776. The loop may then return to step 740 and the next interface of each match iterator whose current index value is equal to the current object identifier may be called.

If, however, there are non-matching regions for the current object identifier (Y branch of step 780), it can then be determined at step 782 if any object identifier returned from any alternative iterator corresponding to any region that did match the comparator and comparison value (e.g., for which a match iterator did return the current object identifier) returned the current object identifier. If so (Y branch of step 782), the current object indicator for the region iterator (equal to the current object identifier) may be added to a list of object identifiers for objects matching the region value term at step 776. The loop may then return to step 740 and the next interface of each match iterator whose current index value is equal to the current object identifier may be called.

It will be helpful to an understanding of certain embodiments to illustrate an embodiment with respect to a set of specific examples. Referring now to FIGS. 8A and 8B, a table including data useful for illustrating examples of a region value search is presented along with a table depicting matching objects for the examples that will be discussed. It will be understood that these examples are discussed with respect to certain embodiments of syntax and implementation and should not be read to apply to embodiments as disclosed herein generally.

Example Searches for "Maximum" Region (Field) Operator

Example Region Value Search Term:
select . . . where [max field1, field2, field3, field4]>3 (or
    select . . . where [region maxField]>3)
Here, this is a simple case, only match iterators are required. If the value of at least one field of an object with a given object identifier matches the search value (>3), then the object corresponding to that identifier mates the region value term. If it is desired to return or specify the matching field for the object, all matching fields may be scanned for the largest value.
In this example, as can be seen from FIG. 8B, Objects 2, 4, 6, 8, 9, 10, 12, 13, 14, 15, 16, 18, 19, 20 match.
Example Region Value Search Term:
select . . . where [max field1, field2, field3, field4]>=3 (or
    select . . . where [region maxField]>=3)
Simple case, only match iterators required. If at least one field matches at a given identifier, then there is a match for that Object identifier. If it is desired to return or specify the matching field for the object, all matching fields may be scanned for the largest value.
In this example, as can be seen from FIG. 8B, Objects 2, 3, 4, 6, 7, 8, 9, 10, 11, 12, 13, 14, 15, 16, 18, 19, 20 match.
Example Region Value Search Term:
select . . . where [max field1, field2, field3, field4]<3 (or
    select . . . where [region maxField]<3)
This example of a region value term requires an alternative iterator (e.g., configured according to comparator >= and a comparison value of 3). If there is a match for any of these alternative iterators for any of the set of regions (e.g., field1, field2, field3, field4) for an object identifier, the object will not match the region value term.
If it is desired to return or specify the matching field for the object, all matching fields may be scanned for the largest value.

1. Find the first match:
    a. Find the lowest matching object identifier in the matching iterators. In this case it is Object 1.
    b. Check that any fields that do not match at this identifier, do not match on the alternative iterator (in this case that the value is >=3). In this case all fields match.
    c. Return that Object 1 is a match.
2. Continue to the next match:
    a. Advance all iterators that are equal to the previously matched identifier.
    b. Find the first occurrence of the lowest matching Object identifier. In this case, it's Object 2.
    c. Check that any fields that do not match at this identifier, do not match on the alternative iterator (in this case that the value is >=3). In this case Field2 matches, so Object 2 is not a match.
    d. Advance all iterators that are equal to the previously matched identifier.
    e. Find the first occurrence of the lowest matching Object identifier. In this case, it's Object 3.
    f. Check that any fields that do not match at this identifier, do not match on the alternative iterator (in this case that the value is >=3). In this case Field1 matches, so Object 3 is not a match.
    g. Advance all iterators that are equal to the previously matched identifier.
    h. Find the first occurrence of the lowest matching Object identifier. In this case, it's Object 4.
    i. Check that any fields that do not match at this identifier, do not match on the alternative iterator (in this case that the value is >=3). In this case Field1 matches, so Object 4 is not a match.
    j. Advance all iterators that are equal to the previously matched identifier.
    k. Find the first occurrence of the lowest matching Object identifier. In this case, it's Object 5.
    l. Check that any fields that do not match at this ID, do not match on the alternative iterator (in this case that the value is >=3). In this case all fields match. m. Return Object 5 is a match.
3. Continue until reaching the end of the iterators.
In this example, as can be seen from FIG. 8B, objects 1, 5, 17 match.
Example Region Value Search Term:
select . . . where [max field1, field2, field3, field4]<=3 (or
    select . . . where [region maxField]<=3)
Like previous, except alternative Iterator is comparator >and comparison value 3.
In this example, as can be seen from FIG. 8B, objects 1, 3, 5, 7, 11, 17 match.
Example Region Value Search Term:
select . . . where [max field1, field2, field3, field4]=3 (or
    select . . . where [region maxField]=3)
This example of a region value term requires an alternative iterator (e.g., configured according to comparator > and a comparison value of 3). If there is a match for this iterator at a given Object identifier, the Object identifier will not match.
If it is desired to return or specify the matching field for the object, all matching fields may be scanned for the largest value. In this case may use the any of the fields as they are all the same.
1. Find the first match:
    a. Find the lowest matching Object identifier in the matching iterators. In this case, it is Object 3.
    b. Check that any fields that do not match at this Object identifier, do not match on the alternative iterator (in this case that the value is >3). In this example, all non-matching fields pass the test for this Object identifier.
    c. Return that Object 3 is a match.
2. Continue to the next match:
    a. Advance all iterators that are equal to the previously matched Object identifier.
    b. Find the first occurrence of the lowest matching Object identifier. In this case, it's Object 7.
    c. Check that any fields that do not match at this Object identifier, do not match on the alternative iterator (in this case that the value is >3). All non matching fields pass the test for this Object identifier.
    d. Return that Object 7 is a match.
3. Continue to the next match:
    a. Advance all iterators that are equal to the previously matched Object identifier.
    b. Find the first occurrence of the lowest matching Object identifier. In this case, it's Object 8.
    c. Check that any fields that do not match at this Object identifier, do not match on the alternative iterator (in this case that the value is >3). Field4 fails the test for this I Object identifier.
    d. Advance all iterators that are equal to the previously matched Object identifier.
    e. Find the first occurrence of the lowest matching Object ID. In this case, it's Object 9.
    f. Check that any fields that do not match at this Object identifier, do not match on the alternative iterator (in this case that the value is >3). Field1 fails the test for this Object identifier.
    g. Advance all iterators that are equal to the previously matched Object identifier.
    h. Find the first occurrence of the lowest matching Object identifier. In this case, it's Object 10.
    i. Check that any fields that do not match at this Object identifier, do not match on the alternative iterator (in this case that the value is >3). Field2 fails the test for this Object identifier.
    j. Advance all iterators that are equal to the previously matched Object identifier.
    k. Find the first occurrence of the lowest matching Object identifier. In this case, it's Object 11.
    l. Check that any fields that do not match at this Object identifier, do not match on the alternative iterator (in this case that the value is >3). All fields pass the test for this Object identifier.
    m. Return Object 11 is a match.
4. Continue in this manner until reaching the end of the iterators.

In this example, as can be seen from FIG. 8B, Objects 3, 7, 11 are responsive to the region value term.

Example Region Value Search Term:
select . . . where [max field1, field2, field3, field4]!=3 (or select . . . where [region maxField]!=3)

This example of a region value term requires an alternative iterator (configured according to comparator > and a comparison value of 3). If all fields do not match the match iterator, then at least one of them must match the alternative iterator or else it is not a match.

If it is desired to return or specify the matching field for the object, all matching fields may be scanned for the largest value.

1. Find the first match:
    a. Find the lowest matching Object identifier in the matching iterators. In this case, it is Object 1.
    b. Check that if there are non-matching fields, at least one of the matching fields matches on the alternative iterator (>3). There are no non-matching fields.
    c. Return that Object 1 is a match.
2. Continue to the next match:
    a. Advance all iterators that are equal to the previously matched Object identifier.
    b. Find the first occurrence of the lowest matching Object identifier. In this case, it's Object 2.
    c. Check that if there are non-matching fields, at least one of the matching fields matches on the alternative iterator (>3). There are no non-matching fields.
    d. Return that Object 2 is a match.
3. Continue to the next match:
    a. Advance all iterators that are equal to the previously matched Object identifier.
    b. Find the first occurrence of the lowest matching Object identifier. In this case, it's Object 3.
    c. Check that if there are non-matching fields, at least one of the matching fields matches on the alternative iterator (>3). It does not.
    d. Advance all iterators that are equal to the previously matched Object identifier.
    e. Find the first occurrence of the lowest matching Object identifier. In this case, it's Object 4.
    f. Check that if there are non-matching fields, at least one of the matching fields matches on the alternative iterator (>3). There are no non-matching fields.
    g. Return that Object 4 is a match.
4. Continue to the next match:
    a. Advance all iterators that are equal to the previously matched Object identifier.
    b. Find the first occurrence of the lowest matching Object identifier. In this case, it's Object 5.
    c. Check that if there are non-matching fields, at least one of the matching fields matches on the alternative iterator (>3). There are no non-matching fields.
    d. Return that Object 5 is a match.
5. Continue to the next match:
    a. Advance all iterators that are equal to the previously matched Object identifier.
    b. Find the first occurrence of the lowest matching Object identifier. In this case, it's Object 6.
    c. Check that if there are non-matching fields, at least one of the matching fields matches on the alternative iterator (>3). There are no non-matching fields.
    d. Return that Object 6 is a match.
6. Continue to the next match:
    a. Advance all iterators that are equal to the previously matched Object identifier.
    b. Find the first occurrence of the lowest matching Object identifier. In this case, it's Object 7.
    c. Check that if there are non-matching fields, at least one of the matching fields matches on the alternative iterator (>3). In this example, they do not.
    d. Advance all iterators that are equal to the previously matched Object identifier.
    e. Find the first occurrence of the lowest matching Object identifier. In this case, it's Object 8.
    f. Check that if there are non-matching fields, at least one of the matching fields matches on the alternative iterator (e.g., >3). Here, Field 4 matches for its alternative iterator.
    g. Return that Object 8 is a match.

As can be seen, the region value iterator may continue on in this manner until the iterators return a maximum integer value, NULL, EOF, or the like.

In this example, as can be seen from FIG. 8B, objects 1, 2, 4, 5, 6, 8, 9, 10, 12, 13, 14, 15, 16, 17, 18, 19, 10 match.

Example Searches for "Minimum" Region (Field) Operator

Example Region Value Search Term:

select . . . where [min field1, field2, field3, field4]<3 (or select . . . where [region minField]<3)

Simple case, only match iterators required. If at least one field matches at a given Object identifier, then there is a match for that Object identifier. If it is desired to return or specify the matching field for the object, all matching fields may be scanned for the smallest value.

In this example, as can be seen from FIG. 8B, objects 1, 2, 3, 4, 5, 6, 7, 8, 9, 10, 11, 12, 13, 14, 16, 17, 18 match.

Example Region Value Search Term:

select . . . where [min field1, field2, field3, field4]<=3 (or select . . . where [region minField]<=3)

Simple case, only match iterators required. If at least one field matches at a given id, then there is a match for that id. If it is desired to return or specify the matching field for the object, all matching fields may be scanned for the smallest value.

In this example, as can be seen from FIG. 8B, objects 1, 2, 3, 4, 5, 6, 7, 8, 9, 10, 11, 12, 13, 14, 15, 16, 17, 18, 19 match.

Example Region Value Search Term:

select . . . where [min field1, field2, field3, field4]>3 (or select . . . where [region minField]>3)

This example of a region value term requires an alternative iterator configured according to comparator <= and a comparison value of 3). If there is a match for this iterator at a given Object identifier, the Object identifier will not match.

If matching field is desired, scan all matching fields for the smallest value.

1. Find the first match:
   a. Find the lowest matching Object identifier in the matching iterators. In this case, it's Object 2.
   b. Check that any fields that do not match at this ID, do not match on the alternative iterator (in this case that the value is <=3). Field 1 matches the alternative iterator, so Object 2 is not a match.
   c. Advance all iterators that are equal to the previously matched Object identifier.
   d. Find the first occurrence of the lowest matching Object identifier. In this case, it's Object 4.
   e. Check that any fields that do not match at this Object identifier, do not match on the alternative iterator (in this case that the value is <=3). In this case Field3 matches, so Object 4 is not a match.
   f. Advance all iterators that are equal to the previously matched Object identifier.
   g. Find the first occurrence of the lowest matching Object identifier. In this case, it's Object 6.
   h. Check that any fields that do not match at this Object identifier, do not match on the alternative iterator (in this case that the value is <=3). In this case Field1 matches, so Object 6 is not a match.
   i. Advance all iterators that are equal to the previously matched Object identifier.
   j. Find the first occurrence of the lowest matching Object identifier. In this case, it's Object 8
   k. Check that any fields that do not match at this Object identifier, do not match on the alternative iterator (in this case that the value is <=3). In this case Field 3 matches, so Object 8 is not a match.
   l. Advance all iterators that are equal to the previously matched Object identifier.
   m. Find the first occurrence of the lowest matching Object identifier. In this case, it's Object 9.
   n. Check that any fields that do not match at this Object identifier, do not match on the alternative iterator (in this case that the value is <=3). In this case Field 2 matches, so Object 9 is not a match.
   o. Advance all iterators that are equal to the previously matched Object identifier. p. Find the first occurrence of the lowest matching Object identifier. In this case, it's Object 10.
   q. Check that any fields that do not match at this Object identifier, do not match on the alternative iterator (in this case that the value is <=3). In this case Field3 matches, so Object 10 is not a match.
   r. Advance all iterators that are equal to the previously matched Object identifier.
   s. Find the first occurrence of the lowest matching Object identifier. In this case, it's Object 12.
   t. Check that any fields that do not match at this Object identifier, do not match on the alternative iterator (in this case that the value is <=3). In this case Field 1 matches, so Object 12 is not a match.
   u. Advance all iterators that are equal to the previously matched Object identifier.
   v. Find the first occurrence of the lowest matching Object identifier. In this case, it's Object 13.
   w. Check that any fields that do not match at this Object identifier, do not match on the alternative iterator (in this case that the value is <=3). In this case Field1 matches, so Object 13 is not a match.
   x. Advance all iterators that are equal to the previously matched Object identifier.
   y. Find the first occurrence of the lowest matching Object identifier. In this case, it's Object 14.
   z. Check that any fields that do not match at this Object identifier, do not match on the alternative iterator (in this case that the value is <=3). In this case Field4 matches, so Object 14 is not a match.
   aa. Advance all iterators that are equal to the previously matched Object identifier.
   bb. Find the first occurrence of the lowest matching Object identifier. In this case, it's Object 15.
   cc. Check that any fields that do not match at this Object identifier, do not match on the alternative iterator (in this case that the value is <=3). In this case Field2 matches, so Object 15 is not a match.
   dd. Advance all iterators that are equal to the previously matched Object identifier.
   ee. Find the first occurrence of the lowest matching Object identifier. In this case, it's Object 16.
   ff. Check that any fields that do not match at this Object identifier, do not match on the alternative iterator (in this case that the value is <=3). In this case Field1 matches, so Object 16 is not a match.
   gg. Advance all iterators that are equal to the previously matched Object identifier.
   hh. Find the first occurrence of the lowest matching Object identifier. In this case, it's Object 18.
   ii. Check that any fields that do not match at this Object identifier, do not match on the alternative iterator (in this case that the value is <=3). In this case Field1 matches, so Object 18 is not a match.
   jj. Advance all iterators that are equal to the previously matched Object identifier.

kk. Find the first occurrence of the lowest matching Object identifier. In this case, it's Object 19.
ll. Check that any fields that do not match at this Object identifier, do not match on the alternative iterator (in this case that the value is <=3). In this case Field2 matches, so Object 19 is not a match.
mm. Advance all iterators that are equal to the previously matched Object identifier.
nn. Find the first occurrence of the lowest matching Object identifier. In this case, it's Object 20.
oo. Check that any fields that do not match at this Object identifier, do not match on the alternative iterator (in this case that the value is <=3). No Fields match the alternative iterator.
pp. Return Object 20 is a match.

Objects 20 match

Example Region Value Search Term:
select . . . where [min field1, field2, field3, field4]>=3 (or select . . . where [region minField]>=3)
Like previous, except alternative Iterator search value has a comparator of < and a comparison value of 3.
In this example, as can be seen from FIG. 8B, Objects 15, 19, 20 match.

Example Region Value Search Term:
select . . . where [min field1, field2, field3, field4]=3 (or select . . . where [region minField]=3)
This example of a region value term requires an alternative iterator (configured according to comparator < and a comparison value of 3). If there is a match for this iterator at a given Object identifier, the Object identifier will not match.
If matching field is desired, scan all matching fields for the smallest value.

1. Find the first match:
   a. Find the lowest matching Object identifier in the matching iterators. In this case, it's Object 3.
   b. Check that any fields that do not match at this Object identifier, do not match on the alternative iterator (in this case that the value is <3). Field3 matches the alternative iterator.
   c. Advance all iterators that are equal to the previously matched Object identifier.
   d. Find the first occurrence of the lowest matching Object identifier. In this case, it's Object 7.
   e. Check that any fields that do not match at this Object identifier, do not match on the alternative iterator (in this case that the value is <3). Field1 matches the alternative iterator.
   f. Advance all iterators that are equal to the previously matched Object identifier.
   g. Find the first occurrence of the lowest matching Object identifier. In this case, it's Object 8.
   h. Check that any fields that do not match at this Object identifier, do not match on the alternative iterator (in this case that the value is <3). Field3 matches the alternative iterator.
   i. Advance all iterators that are equal to the previously matched Object identifier.
   j. Find the first occurrence of the lowest matching Object identifier. In this case, it's Object 9.
   k. Check that any fields that do not match at this Object identifier, do not match on the alternative iterator (in this case that the value is <3). Field2 matches the alternative iterator.
   l. Advance all iterators that are equal to the previously matched Object identifier.
   m. Find the first occurrence of the lowest matching Object ID. In this case, it's Object 10.
   n. Check that any fields that do not match at this Object identifier, do not match on the alternative iterator (in this case that the value is <3). Field4 matches the alternative iterator.
   o. Advance all iterators that are equal to the previously matched Object identifier.
   p. Find the first occurrence of the lowest matching Object identifier. In this case, it's Object 11.
   q. Check that any fields that do not match at this Object identifier, do not match on the alternative iterator (in this case that the value is <3). Field1 matches the alternative iterator.
   r. Advance all iterators that are equal to the previously matched Object identifier.
   s. Find the first occurrence of the lowest matching Object identifier. In this case, it's Object 12.
   t. Check that any fields that do not match at this Object identifier, do not match on the alternative iterator (in this case that the value is <3). Field1 matches the alternative iterator.
   u. Advance all iterators that are equal to the previously matched Object identifier.
   v. Find the first occurrence of the lowest matching Object identifier. In this case, it's Object 13.
   w. Check that any fields that do not match at this Object identifier, do not match on the alternative iterator (in this case that the value is <3). Field2 matches the alternative iterator.
   x. Advance all iterators that are equal to the previously matched Object identifier.
   y. Find the first occurrence of the lowest matching Object identifier. In this case, it's Object 15.
   z. Check that any fields that do not match at this Object identifier, do not match on the alternative iterator (in this case that the value is <3). No Field matches alternative iterator.
   aa. Return that Object 15 is a match.

The region value iterator may continue on in this manner until the iterators return a maximum integer value, NULL, EOF, or the like.
In this example, as can be seen from FIG. 8B, Objects 15, 19 are matches.

Example Region Value Search Term:
select . . . where [min field1, field2, field3, field4]!=3 (or select . . . where [region minField]!=3)
This example of a region value term requires an alternative iterator configured according to comparator < and a comparison value of 3. If all fields do not match the match iterator, than at least one of them must match the alternative iterator or else it is not a match.
If matching field is required, scan all matching fields for the smallest.

1. Find the first match:
   a. Find the lowest matching Object identifier in the matching iterators. In this case, it's Object 1.
   b. Check that if there are non-matching fields, at least one of the matching fields matches on the alternative iterator (<3). There are no non-matching fields.
   c. Return that Object 1 is a match.
2. Continue to the next match:
   a. Advance all iterators that are equal to the previously matched Object identifier.
   b. Find the first occurrence of the lowest matching Object identifier. In this case, it's Object 2.

c. Check that if there are non-matching fields, at least one of the matching fields matches on the alternative iterator (<3). There are no non-matching fields.
d. Return that Object 2 is a match.
3. Continue to the next match:
   a. Advance all iterators that are equal to the previously matched Object identifier.
   b. Find the first occurrence of the lowest matching Object identifier. In this case, it's Object 3.
   c. Check that if there are non-matching fields, at least one of the matching fields matches on the alternative iterator (<3). Field3 matches the alternative iterator.
   d. Return that Object 3 is a match.
4. Continue to the next match:
   a. Advance all iterators that are equal to the previously matched Object identifier.
   b. Find the first occurrence of the lowest matching Object identifier. In this case, it's Object 4.
   c. Check that if there are non-matching fields, at least one of the matching fields matches on the alternative iterator (<3). Here, there are no non-matching fields.
   d. Return that Object 4 is a match.
5. Continue to the next match:
   a. Advance all iterators that are equal to the previously matched Object identifier.
   b. Find the first occurrence of the lowest matching Object identifier. In this case, it's Object 2.
   c. Check that if there are non-matching fields, at least one of the matching fields matches on the alternative iterator (<3). There are no non-matching fields.
   d. Return that Object 2 is a match.

As can be seen, here, the region value iterator may continue on in this manner until the iterators return a maximum integer value, NULL, EOF, or the like.

In this example, as can be seen from FIG. 8B, Objects 1, 2, 4, 5, 6, 7, 8, 9, 10, 11, 12, 13, 14, 16, 17, 18, 20 match.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, HDs, data cartridges, magnetic tapes, floppy diskettes, flash memory drives, optical data storage devices, CD-ROMs, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose CPU, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A search system, comprising:
a processor;
a data store, having a corpus and an index of the corpus stored thereon, the corpus comprising a set of objects, each object associated with a corresponding identifier; and
a non-transitory computer readable medium, having instructions executable on the processor for:
receiving a search query having a region value term, the region value term including a region value operator, a set of regions and a first search value including a first comparator and a first comparison value;
generating a search tree for the region value term, the search tree having a region value node configured according to the region value operator, the set of regions and the first search value, wherein the region value node has, for each region of the set of regions, a sub-node comprising a first match process corresponding to the region and the first search value;
determining when any alternative processes are needed based on the region value operator and the first comparator;
when any alternative processes are needed, including each alternative process in a sub-node of the search tree for a corresponding region, the alternative process corresponding to the region and a second search value including a second comparator and the first comparison value, the second comparator determined based on the region value operator and the first comparator;
executing the search tree using the index to determine one or more objects of the corpus that satisfy the region value term, wherein executing the search tree comprises:
receiving a first result from each of the first match processes and evaluating the first result from each of the first match processes to determine when an object has a matching value for the first search value in a first region of the set of regions and,
when the object has the matching value for the first search value in the first region, determining when there are any alternative processes for any other region in the set of regions, and when there are any alternative processes for any other regions in the set of regions, receiving a second result from each of the alternative processes and evaluating the second result from each of the alternative processes to determine when the object has a matching value for the second search value in any other region, wherein the object is identified as satisfying the region value term when the object has the matching value for the first search value in the first region and does not have the matching value of the second search value in any other region; and
returning the identifiers for the one or more objects of the corpus that satisfy the region value operator.

2. The search system of claim 1, wherein each of the match processes is a match iterator configured to evaluate the objects of the corpus according to an order of the identifiers of the objects and the result is an identifier of the next object containing the search value in the region corresponding to the match process.

3. The search system of claim 2, wherein the order of the identifiers is sequential.

4. The search system of claim 3, wherein the region value node is configured to call each of the match processes to determine the result for that match process.

5. The search system of claim 4, wherein each of the alternative processes is a second match iterator configured to be initialized with an object identifier and evaluate the objects of the corpus according to the corresponding region and the second result from the second match iterator is the identifier of any next object containing a value in the corresponding region matching the second search value.

6. The search system of claim 5, wherein the region value operator is a maximum operator for determining when a maximum value in the set of regions for the object meets the search value or a minimum operator for determining when a minimum value in the set of regions for the object meets the search value.

7. A non-transitory computer readable medium, comprising instructions for:
storing a corpus and an index of the corpus in a data store, the corpus comprising a set of objects, each object associated with a corresponding identifier;
receiving a search query having a region value term, the region value term including a region value operator, a set of regions and a first search value including a first comparator and a first comparison value;
generating a search tree for the region value term, the search tree having a region value node configured according to the region value operator, the set of regions and the first search value, wherein the region value node has, for each region of the set of regions, a sub-node comprising a first match process corresponding to the region and the first search value;
determining when any alternative processes are needed based on the region value operator and the first comparator;
when any alternative processes are needed, including each alternative process in a sub-node of the search tree for a corresponding region, the alternative process corresponding to the region and a second search value including a second comparator and the first comparison value, the second comparator determined based on the region value operator and the first comparator;
executing the search tree using the index to determine one or more objects of the corpus that satisfy the region value term, wherein executing the search tree comprises:
receiving a first result from each of the first match processes and evaluating the first result from each of the first match processes to determine when an object has a matching value for the first search value in a first region of the set of regions and,
when the object has the matching value for the first search value in the first region, determining when there are any alternative processes for any other region in the set of regions, and when there are any alternative processes for any other regions in the set of regions, receiving a second result from each of the alternative processes and evaluating the second result from each of the alternative processes to determine when the object has a matching value for the second search value in any other region, wherein the object is identified as satisfying the region value term when the object has the matching value for the first search value in the first region and does not have the matching value of the second search value in any other region; and returning the identifiers for the one or more objects of the corpus that satisfy the region value operator.

8. The non-transitory computer readable medium of claim 7, wherein each of the match processes is a match iterator configured to evaluate the objects of the corpus according to an order of the identifiers of the objects and the result is an identifier of the next object containing the search value in the region corresponding to the match process.

9. The non-transitory computer readable medium of claim 8, wherein the order of the identifiers is sequential.

10. The non-transitory computer readable medium of claim 9, wherein the region value node is configured to call each of the match processes to determine the result for that match process.

11. The non-transitory computer readable medium of claim 10, wherein each of the alternative processes is a second match iterator configured to be initialized with an object identifier and evaluate the objects of the corpus according to the corresponding region and the second result from the second match iterator is the identifier of any next object containing a value in the corresponding region matching the second search value.

12. The non-transitory computer readable medium of claim 11, wherein the region value operator is a maximum operator for determining when a maximum value in the set of regions for the object meets the search value or a minimum operator for determining when a minimum value in the set of regions for the object meets the search value.

13. A method, comprising:
storing a corpus and an index of the corpus in a data store, the corpus comprising a set of objects, each object associated with a corresponding identifier;
receiving a search query having a region value term, the region value term including a region value operator, a set of regions and a first search value including a first comparator and a first comparison value;
generating a search tree for the region value term, the search tree having a region value node configured according to the region value operator, the set of regions and the first search value, wherein the region value node has, for each region of the set of regions, a sub-node comprising a first match process corresponding to the region and the first search value;
determining when any alternative processes are needed based on the region value operator and the first comparator;
when any alternative processes are needed, including each alternative process in a sub-node of the search tree for a corresponding region, the alternative process corresponding to the region and a second search value including a second comparator and the first comparison value, the second comparator determined based on the region value operator and the first comparator;
executing the search tree using the index to determine one or more objects of the corpus that satisfy the region value term, wherein executing the search tree comprises:
receiving a first result from each of the first match processes and evaluating the first result from each of the first match processes to determine when an object has a matching value for the first search value in a first region of the set of regions and,
when the object has the matching value for the first search value in the first region, determining when there are any alternative processes for any other region in the set of regions, and when there are any alternative processes for any other regions in the set of regions, receiving a second result from each of the alternative processes and evaluating the second result from each of the alternative processes to determine when the object has a matching value for the second search value in any other region, wherein the object is identified as satisfying the region value term when the object has the matching value for the first search value in the first region and does not have the matching value of the second search value in any other region; and
returning the identifiers for the one or more objects of the corpus that satisfy the region value operator.

14. The method of claim 13, wherein each of the match processes is a match iterator configured to evaluate the objects of the corpus according to an order of the identifiers of the objects and the result is an identifier of the next object containing the search value in the region corresponding to the match process.

15. The method of claim 14, wherein the order of the identifiers is sequential.

16. The method of claim 15, wherein the region value process is configured to call each of the match processes to determine the result for that match process.

17. The method of claim 16, wherein each of the alternative processes is a second match iterator configured to be initialized with an object identifier and evaluate the objects of the corpus according to the corresponding region and the second result from the second match iterator is the identifier of any next object containing a value in the corresponding region matching the second search value.

18. The method of claim 17, wherein the region value operator is a maximum operator for determining when a maximum value in the set of regions for the object meets the search value or a minimum operator for determining when a minimum value in the set of regions for the object meets the search value.

* * * * *